United States Patent
Sundberg et al.

(10) Patent No.: US 10,805,866 B2
(45) Date of Patent: Oct. 13, 2020

(54) EXTENDED BASE STATION IDENTIFICATION CODE COMPRISING A RADIO FREQUENCY COLOR CODE

(71) Applicant: Telefonaktiebolaget LM Ericsson (publ), Stockholm (SE)

(72) Inventors: Mårten Sundberg, Årsta (SE); Jens Bergqvist, Linköping (SE); John Walter Diachina, Garner, NC (US); Stefan Eriksson Löwenmark, Färentuna (SE); Olof Liberg, Stockholm (SE); Joakim Riedel, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 54 days.

(21) Appl. No.: 16/094,996

(22) PCT Filed: Apr. 21, 2017

(86) PCT No.: PCT/SE2017/050391
§ 371 (c)(1),
(2) Date: Oct. 19, 2018

(87) PCT Pub. No.: WO2017/184070
PCT Pub. Date: Oct. 26, 2017

(65) Prior Publication Data
US 2019/0132786 A1 May 2, 2019

Related U.S. Application Data

(60) Provisional application No. 62/325,736, filed on Apr. 21, 2016.

(51) Int. Cl.
*H04W 48/12* (2009.01)
*H04W 76/28* (2018.01)
(Continued)

(52) U.S. Cl.
CPC ............. *H04W 48/12* (2013.01); *H04W 8/26* (2013.01); *H04W 72/14* (2013.01);
(Continued)

(58) Field of Classification Search
None
See application file for complete search history.

(56) References Cited

U.S. PATENT DOCUMENTS

| 6,957,072 B2 | 10/2005 | Kangras et al. |
| 7,280,831 B2 | 10/2007 | Moilanen et al. |

(Continued)

FOREIGN PATENT DOCUMENTS

| EP | 2187688 A2 | 5/2010 |
| RU | 2449506 C2 | 4/2012 |
| RU | 2477933 C2 | 3/2013 |

OTHER PUBLICATIONS

3GPP, "3rd Generation Partnership Project; Technical Specification Group Core Network and Terminals; Mobile radio interface Layer 3 specification; Core network protocols; Stage 3 (Release 13)", 3GPP TS 24.008 V13.1.0, Mar. 2015, 1-714.
(Continued)

*Primary Examiner* — Michael J Moore, Jr.
(74) *Attorney, Agent, or Firm* — Murphy, Bilak & Homiller, PLLC

(57) ABSTRACT

Methods, network node (110, 800) and device (120; 1000) for managing a cell identity of a cell (115) in a GSM network (100). The device (120; 1000) receives, from the network node (110; 800), a cell identifier for identifying said cell (115), which cell identifier is a Base Station Identity Code, "BSIC", coding an identity of said cell (115) and being formed of at least three sets of bits: A first three bits set thereof being a Network Color Code, "NCC", a second three bits set thereof being a Base Station Color Code, "BCC", and an additional third set thereof comprising one or more bits.

12 Claims, 10 Drawing Sheets

(51) Int. Cl.
H04W 76/11 (2018.01)
H04W 8/26 (2009.01)
H04W 72/14 (2009.01)
H04W 74/08 (2009.01)

(52) U.S. Cl.
CPC ........ *H04W 74/0833* (2013.01); *H04W 76/11* (2018.02); *H04W 76/28* (2018.02)

(56) References Cited

U.S. PATENT DOCUMENTS

| | | | | |
|---|---|---|---|---|
| 9,007,935 | B2* | 4/2015 | Haswarey | H04W 24/04 |
| | | | | 370/252 |
| 9,107,182 | B2* | 8/2015 | Kwun | H04W 72/00 |
| 2004/0082344 | A1 | 4/2004 | Moilanen et al. | |
| 2005/0180351 | A1* | 8/2005 | Peric | H04W 48/12 |
| | | | | 370/328 |
| 2008/0130586 | A1* | 6/2008 | Johnson | H04W 36/0088 |
| | | | | 370/333 |
| 2010/0178934 | A1 | 7/2010 | Moeglein et al. | |
| 2010/0317351 | A1* | 12/2010 | Gerstenberger | H04W 8/26 |
| | | | | 455/443 |
| 2011/0190000 | A1* | 8/2011 | Kwun | H04W 72/00 |
| | | | | 455/450 |
| 2013/0217381 | A1 | 8/2013 | Dhanda et al. | |
| 2014/0161116 | A1* | 6/2014 | Das | H04W 56/0085 |
| | | | | 370/350 |
| 2015/0304932 | A1* | 10/2015 | Wei | H04J 11/0069 |
| | | | | 370/331 |
| 2018/0103380 | A1* | 4/2018 | Ode | H04W 16/14 |

OTHER PUBLICATIONS

3GPP, "3rd Generation Partnership Project; Technical Specification Group Core Network and Terminals; Numbering, addressing and identification (Release 13)", 3GPP TS 23.003 V13.1.0, Mar. 2015, 1-92.
3GPP, "3rd Generation Partnership Project; Technical Specification Group Core Network and Terminals; Numbering, addressing and identification (Release 13)", 3GPP TS 23.003 V13.5.0, Mar. 2016, 1-100.
3GPP, "3rd Generation Partnership Project; Technical Specification Group GSM/EDGE Radio Access Network; Cellular system support for ultra-low complexity and low throughput Internet of Things (CIoT) (Release 13)", 3GPP TR 45.820 V13.0.0, Aug. 2015, 1-495.
3GPP, "3rd Generation Partnership Project; Technical Specification Group GSM/EDGE Radio Access Network; Channel coding (Release 13)", 3GPP TS 45.003 V13.1.0, Feb. 2016, 1-334.
3GPP, "3rd Generation Partnership Project; Technical Specification Group GSM/EDGE Radio Access Network; Mobile radio interface layer 3 specification; Radio Resource Control (RRC) protocol (Release 13)", 3GPP TS 44.018 V13.1.0, Feb. 2016, 1-524.
3GPP, "3rd Generation Partnership Project; Technical Specification Group GSM/EDGE Radio Access Network; Multiplexing and multiple access on the radio path (Release 13)", 3GPP TS 45.002 V13.0.0, Nov. 2015, 1-120.
3GPP, "3rd Generation Partnership Project; Technical Specification Group GSM/EDGE Radio Access Network; Radio subsystem link control (Release 13)", 3GPP TS 45.008 V13.1.0, Feb. 2016, 1-161.
3GPP, "3rd Generation Partnership Project; Technical Specification Group GSM/EDGE Radio Access Network; Radio transmission and reception (Release 13)", 3GPP TS 45.005 V13.0.0, Dec. 2015, 1-271.
Unknown, Author, "Discovery of Small Cells", 3GPP TSG-RAN WG1 Meeting #74, R1-133394, Barcelona, Spain, Aug. 19-23, 2013, 1-8.
Unknown, Author, "Introduction of Radio Frequency Color Code", 3GPP TSG GERAN#70, Tdoc GP-160292, Nanjing, P.R. China, Ericsson LM, Aug. 23-28, 2016, 1-8.
Unknown, Author, "Introduction to Radio frequency Colour Code (RCG)", 3GPP TSG-GERAN Meeting #70, GP-160294, Nanjing, China, May 23-27, 2016, 1-2.
Unknown, Author, "New Work Item on Extended Coverage GSM (EC-GSM) for support of Cellular Internet of Things", 3GPP TSG GERAN#67, GP-151039, Yinchuan, P.R. China, Aug. 10-14, 2015, 1-7.
Unknown, Author, "Pseudo CR 45.820—EC-GSM—Concept description", 3GPP TSG GERAN Ad Hoc #1 on Cellular IoT, GPC-150125, Ericsson LM, Feb. 2-5, 2015, 1-28.

* cited by examiner

EXTENDED BASE STATION IDENTIFICATION CODE COMPRISING A RADIO FREQUENCY COLOR CODE

TECHNICAL FIELD

Embodiments herein relate to methods and arrangements for managing a cell identity of a cell in a GSM network, which cell identity is a Base Station Identity Code (BSIC).

BACKGROUND

Communication devices such as wireless communication devices, that simply may be named wireless devices, may also be known as e.g. User Equipments (UEs), mobile terminals, wireless terminals and/or Mobile Stations (MS). A wireless device is enabled to communicate wirelessly in a wireless communication network that typically is a cellular communications network, which may also be referred to as a wireless communication system, or radio communication system, sometimes also referred to as a cellular radio system, cellular network or cellular communication system. A wireless communication network may sometimes simply be referred to as a network and abbreviated NW. The communication may be performed e.g. between two wireless devices, between a wireless device and a regular telephone and/or between a wireless device and a server via a Radio Access Network (RAN) and possibly one or more Core Networks (CN), comprised within the wireless communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type Communication (MTC) devices, i.e. a device that is not necessarily associated with a conventional user, such as a human, directly using the device. MTC devices may be as defined by 3GPP:

The wireless device may be, for example, portable, pocket-storable, hand-held, computer-comprised, or vehicle-mounted mobile device, enabled to communicate voice and/or data, via the RAN, with another entity, such as another wireless device or a server.

The cellular communication network covers a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site provides radio coverage for one or more cells. A cell is thus associated with a geographical area where radio coverage for that cell is provided by the base station at the base station site. Cells may overlap so that several cells cover the same geographical area. By the base station providing or serving a cell is meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile).

In 3rd Generation Partnership Project (3GPP) Long Term Evolution (LTE), base stations, which may be referred to as eNodeBs or eNBs, may be directly connected to other base stations and may be directly connected to one or more core networks.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices.

General Packet Radio Service (GPRS) is a packet oriented mobile data service on the 2G cellular communication system's global system for mobile communications (GSM).

Enhanced Data rates for GSM Evolution (EDGE) also known as Enhanced GPRS (EGPRS), or IMT Single Carrier (IMT-SC), or Enhanced Data rates for Global Evolution is a digital mobile phone technology that allows improved data transmission rates as a backward-compatible extension of GSM.

High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The 3GPP has undertaken to evolve further the UTRAN and GSM based radio access network technologies, for example into evolved UTRAN (E-UTRAN) used in LTE.

The expression downlink, which may be abbreviated DL, is used for the transmission path from the base station to the wireless device. The expression uplink, which may be abbreviated UL, is used for the transmission path in the opposite direction i.e. from the wireless device to the base station.

Machine Type Communication (MTC) has in recent years, especially in the context of the Internet of Things (IoT), shown to be a growing market segment for cellular technologies. An MTC device may be a communication device, typically a wireless communication device or simply wireless device, that is a self and/or automatically controlled unattended machine and that is typically not associated with an active human user in order to generate data traffic. A MTC device is typically more simple, and typically associated with a more specific application or purpose, than and in contrast to a conventional mobile phone or smart phone. MTC involves communication in a wireless communication network to and/or from MTC devices, which communication typically is of quite different nature and with other requirements than communication associated with e.g. conventional mobile phones and smart phones. In the context of and growth of the IoT it is evidently so that MTC traffic will be increasing and thus needs to be increasingly supported in wireless communication systems.

A problem related to (re)using existing technologies and systems is that the requirements for the new type of devices are typically different than conventional requirements, e.g. regarding the type and amount of traffic, performance etc. Existing systems have not been developed with these new requirements in mind. Also, traffic generated by new type of devices will typically be in addition to conventional traffic already supported by an existing system, which existing traffic typically needs to continue to be supported by and in the system, preferably without any substantial disturbance and/or deterioration of already supported services and performance.

Any modifications need of existing systems and technology should of course be cost efficient, such as enabled by low complexity modifications, and preferably allowing legacy devices, i.e. devices already being employed, to continue to be used and co-exist with the new type of devices in one and the same wireless communication system.

3GPP GERAN did under 3GPP release 13 perform a study to distinguish cellular technologies suitable to support Internet of Things (IoT) services in cellular networks. The report summarizing this work is found in 3GPP TR 45.820 V13.0.0, "Cellular System Support for Ultra Low Complexity and Low Throughput Internet of Things".

As a consequence of the conclusion in 3GPP TR 45.820 V13.0.0, a 3GPP Work Item (WI) on Extended Coverage GSM (EC-GSM-IoT) was approved in GP-151039, "New Work Item on Extended Coverage GSM (EC-GSM) for support of Cellular Internet of Things (CIoT_EC_GSM)", GERAN #67, Ericsson LM, Intel, Gemalto N.V., MediaTek Inc., TeliaSonera AB, Sierra Wireless, S.A., Telit Communications S.p.A., ORANGE, Nokia Networks, Alcatel Lucent. The objective of the EC-GSM work item was to introduce an Extended Coverage EGPRS (EC-EGPRS) feature in the 3GPP technical specifications.

Hence, although EC-GSM-IoT is now is an accepted denotion, it may be noted that also the names EC-GSM and even EC-EGPRS have been used in the past.

Services relating to EC-GSM-IoT are expected to be characterized by requirements on long radio coverage range, long battery life, low complexity as well as short data transfers. For example, an intention has been to improve coverage with 20 dB, to improve battery life time (i.e. be more energy efficient), keeping a minimum bitrate and to decrease device complexity. On the control channels the coverage is to be improved by for example using blind physical layer transmissions of radio blocks while on the data channels the coverage is improved using a combination of blind physical layer transmissions and HARQ retransmissions of radio blocks.

In order to meet requirements especially associated with MTC-devices, extended discontinuous reception (eDRX) has been discussed, see e.g. TR 45.820 v13.0.0, in order to utilize the fact that MTC-devices typically need not be reachable and responsive to paging as often as other, such as conventional mobile phones, and are also in greater need for lower power consumption. By extending DRX, e.g. in relation to conventional DRX in an existing RAT, e.g. adapted to better support MTC devices, energy consumption can be substantially reduced and thereby battery time can be substantially prolonged for MTC devices operating according to the eDRX.

In the following, MS may be used to denote a communication device for use in a GSM or GSM based network.

Further, mobile network operators offering standardized mobile services in licensed frequency bands are currently put under pressure by competitors offering proprietary solutions for long range, long battery life and low complexity Internet of Things (IoT) communication in unlicensed frequency bands. As a consequence 3GPP GERAN is in release 13 driving the Extended Coverage GSM IoT, second type, Work Item (WI) GP-151039, "New Work Item on Extended Coverage GSM (EC-GSM) for support of Cellular Internet of Things", GERAN #67, source Ericsson et al., as mentioned above, to introduce a standardized solution targeting long range, long battery life and low complexity IoT communications.

To reach the battery savings target of 10 years an EC-GSM-IoT capable MS is relying on the 3GPP Release 12 feature Power Save Mode (PSM) or Release 13 feature extended DRX (eDRX), such as described above, in combination with relaxed requirements on monitoring serving and neighboring cells. In case of PSM a MS can go to sleep for as long as it desires and wake up only when higher layer triggers a MS originated network access. eDRX is designed to give a tradeoff between power savings and MS reachability by network triggered access. Sleep times of up to 52 minutes is supported for GSM. The relaxed requirements on monitoring serving and neighboring cells supports significantly less measurements and System Information (SI) readings by allowing a MS to camp on a suitable cell instead of always camping on the most suitable cell.

It is further so that Operators would like to support IoT services on a minimal amount of frequency resources. The EC-GSM-IoT WI is therefore investigating operation using down to only 600 kHz, i.e. three GSM channels configured in a ⅓ frequency reuse pattern. An alternative method of minimizing the spectrum resources per operator is to share a network between up to four operators using the feature Network sharing, see e.g. 3GPP TS 44.018 v13.1.0.

A cell in a GSM network is uniquely identified by the two octets Cell Identity Information Element, see e.g. 3GPP TS 24.008 v13.0.0, the Location Area information, including the identity of the Public Land Mobile Network (PLMN) that the GSM network corresponds to, and, in case of GPRS/EGPRS, the Routing Area information broadcasted in the System Information (SI). To relax the requirement on reading the system information to obtain the Cell ID and/or the Location Area and Routing Area information, a compact six bit Base Station Identity Code (BSIC) is transmitted on the Synchronization CHannel (SCH). This facilitates detection of a certain cell while synchronizing to the same.

SUMMARY

An object is to provide one or more improvements with regard to how cell identities are managed in a GSM network.

According to a first aspect of embodiments herein, the object is achieved by a first method, performed by a network node of a GSM network, for managing a cell identity of a cell in the GSM network. The cell identity is directed to devices configured to be served in the GSM network. The network node obtains a cell identifier for identifying said cell, which cell identifier is a Base Station Identity Code (BSIC) coding an identity of said cell and being formed of at least three sets of bits: A first three bits set thereof being a Network Color Code (NCC). A second three bits set thereof being a Base Station Color Code (BCC). An additional, third set thereof comprising one or more bits. The network node then transmits the cell identifier in the cell so that the cell identifier is receivable by said devices and the cell thereby can be identified by said devices.

According to a second aspect of embodiments herein, the object is achieved by a computer program comprising instructions that when executed by a network node causes the network node to perform the method according to the first aspect.

According to a third aspect of embodiments herein, the object is achieved by a computer readable medium comprising the computer program according to the second aspect.

According to a fourth aspect of embodiments herein, the object is achieved by a second method, performed by a device for managing a cell identity of a cell in a GSM network. The device receives, from a network node comprised in the GSM network, a cell identifier for identifying said cell, which cell identifier is a Base Station Identity Code (BSIC) coding an identity of said cell and being formed of at least three sets of bits: A first three bits set thereof being a Network Color Code (NCC). A second three bits set thereof being a Base Station Color Code (BCC), and an additional, third set thereof comprising one or more bits.

According to a fifth aspect of embodiments herein, the object is achieved by a computer program comprising instructions that when executed by a device causes the device to perform the method according to the first aspect.

According to a sixth aspect of embodiments herein, the object is achieved by a computer readable medium comprising the computer program according to the fifth aspect.

According to a seventh aspect of embodiments herein, the object is achieved by a network node for managing a cell identity of a cell in a GSM network that the network node is configured to be comprised in, which cell identity is directed to devices configured to be served in the GSM network. The network node being configured to obtain a cell identifier for identifying said cell, which cell identifier is a Base Station Identity Code (BSIC) coding an identity of said cell and being formed of at least three sets of bits: A first three bits set thereof being a Network Color Code (NCC). A second three bits set thereof being a Base Station Color Code (BCC). An additional, third set thereof comprising one or more bits. The network node is further configured to transmit the cell identifier in the cell so that the cell identifier is receivable by said devices and the cell thereby can be identified by said devices.

According to an eight aspect of embodiments herein, the object is achieved by a device for managing a cell identity of a cell in a GSM network. The device is configured to receive, from a network node comprised in the GSM network, a cell identifier for identifying said cell, which cell identifier is a Base Station Identity Code (BSIC) coding an identity of said cell and being formed of at least three sets of bits: A first three bits set thereof being a Network Color Code (NCC). A second three bits set thereof being a Base Station Color Code (BCC), and an additional, third set thereof comprising one or more bits.

Said identity should be within a group of cells that use the same frequency of their Broadcast CHannels (BCHs), i.e. cells that else, and in certain situations with a conventional BSIC with only the two first bit sets, cannot be discriminated between. Thanks to the BSIC with the additional third set of bits, ambiguities in cell identification can be avoided. As a result a tighter frequency reuse can be supported in the GSM network, e.g. a GSM/EDGE network, without the risk of introducing ambiguities in the cell identification. This is e.g. particularly beneficial in the case the GSM network supports EC-GSM-IoT, PSM, Power Efficient Operation (PEO) and/or eDRX. At the same time there will be backwards compatibility since the NCC and BCC need no change and can function as before with conventionally operating, i.e. legacy, devices served in the GSM network.

Hence, embodiments herein provide an improvement with regard to how cell identities are handled in a GSM network.

BRIEF DESCRIPTION OF THE DRAWINGS

The various aspects of embodiments disclosed herein, including particular features and advantages thereof, will be readily understood from the following detailed description and the accompanying drawings, in which FIGS. 1-13 are shown.

FIG. 1 schematically illustrates a situation in a so called ⅓ frequency reuse network using 8 BSIC identifiers.

FIG. 2 is a block diagram schematically depicting an example of a wireless communication network in which embodiments and solutions herein may be implemented.

FIG. 3 presents an example of performance of an Extended Coverage Synchronization CHannel (EC-SCH) in a situation with extended bits when implementing some embodiments herein.

FIG. 4 presents an example of performance of an Extended Coverage Random Access CHannel (EC-RACH) in a situation with extended bits when implementing some embodiments herein.

FIG. 5 presents an example of EC-RACH false positive performance.

FIG. 6 is a combined signaling diagram and flowchart for describing some embodiments herein.

FIG. 7 is a flowchart schematically illustrating embodiments of a first method according to embodiments herein.

FIG. 8 is a functional block diagram for illustrating embodiments of a network node according to embodiments herein and how it can be configured to carry out the first method.

FIG. 9 is a flowchart schematically illustrating embodiments of a second method according to embodiments herein.

FIG. 10 is a functional block diagram for illustrating embodiments of a device according to embodiments herein and how it can be configured to carry out the second method.

FIG. 11 is a flowchart schematically illustrating embodiments of a third method relating to a second solution.

FIG. 12 is a functional block diagram for illustrating embodiments of a device according to the second solution and how it can be configured to carry out the third method.

DETAILED DESCRIPTION

Figure 1:
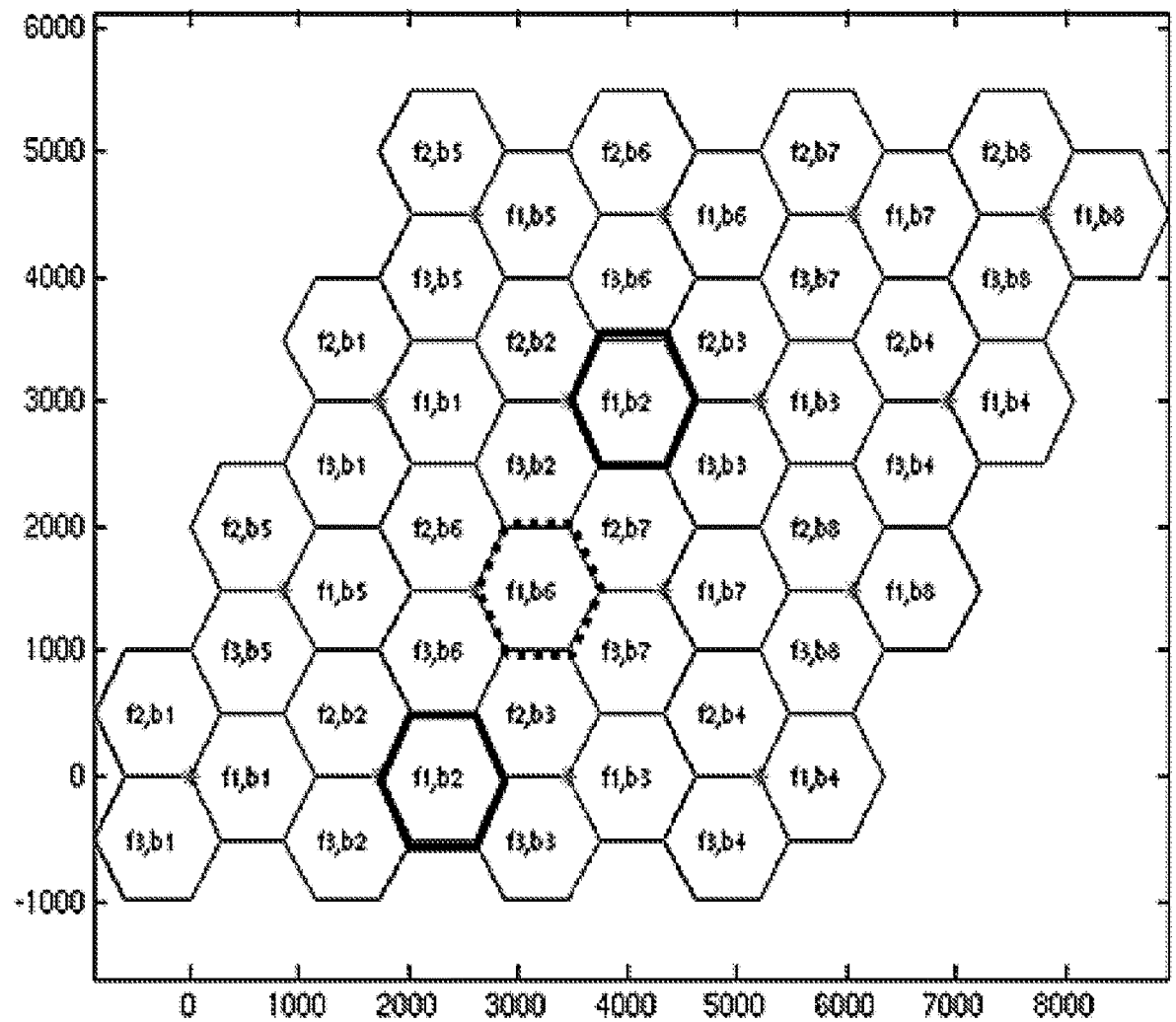

Throughout the following description similar reference numerals may be used to denote similar elements, units, modules, circuits, nodes, parts, items or features, when applicable. In the Figures, features that appear only in some embodiments are typically indicated by dashed lines.

In the following, embodiments herein are illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

As part of a development towards embodiments herein, the problems indicated in the Background will first further be discussed.

The detection of a cell through the six bit BSIC as mentioned in the Background is depending on that the BSIC is uniquely configured over neighboring cells using the same Broadcast CHannel (BCH) Absolute Radio Frequency Channel Number (ARFCN). Re-using a BSIC identifier in two neighboring cells using the same BCH ARFCN would create an unwanted ambiguity preventing a MS from discriminating between the two neighboring cells.

The BSIC is conventionally defined by a three bit Network Color Code (NCC) and a three bit Base Station Color Code (BCC). Guidance for traditional planning of the BSIC and especially the NCC is described in TS 23.003, e.g. 3GPP TS 23.003 v13.0.0. It can be noticed that restrictions in the usage of the 64 unique identifiers provided by the BSIC historically has applied only at country borders where operators in neighboring countries is suggested by said TS 23.003 to use distinct NCC identifiers. With the introduction of the Network Sharing feature a further restriction is introduced through the NCC Permitted Information Element (IE) broadcasted in the SI messages. NCC Permitted specifies the allowed NCC code points that a MS may monitor in a shared network. In worst case only a single NCC identifier is allowed to be monitored, which effectively reduces the number of unique BSIC identifiers to 8 in a shared network.

The trend to tighten the GSM frequency reuse further limits the number of unique BSIC and ARFCN combinations. Compare e.g. a classical GSM network deployment using 12 ARFCNs for the BCCH plan and 64 different BSICs with a network using 3 ARFCNs that is limited to using only 8 BSICs due to the use of Network sharing. The former case supports 768 (12×64) unique ARFCN and BSIC combinations while the latter only supports 24 (3*8) unique combinations.

FIG. 1 schematically illustrates a situation in a so called a ⅓ frequency reuse network using 8 BSIC identifiers. The ARFCN assigned to a cell is denoted "fx" with x selected from the set of ARFCNs {1, 2, 3}. The BSIC assigned to a cell is denoted "by" with y selected from the set of BSIC identifiers {1, 2, 3, 4, 5, 6, 7, 8}. It is clear from the example in the picture that a combination of ARFCN and BSIC is reoccurring twice in a small area leading to ambiguous cell identification. A MS located in the cell highlighted with a thick dashed cell border will e.g. not be able to discriminate between the two cells marked with thick solid cell borders, configured with the same ARFCN and BSIC combination, when performing neighbor cell monitoring.

With the introduction of PSM and eDRX, as mentioned in the Background, a MS may also go to sleep for extended periods, and can wake up in a new cell B far away from the last camped on cell A. If cell A and B are configured with the same BSIC and BCCH ARFCN then the MS will detect that cell B is a new cell first when it reads the system information (SI). A legacy GSM/EDGE MS is mandated to read the SI containing the two octet Cell Identifier and the Location Area and Routing Area information every 30 seconds and will quickly understand that it has entered a new cell B.

GSM/EDGE devices supporting 3GPP Release 13 EC-GSM-IoT or Power Efficient Operation (PEO) is however not required to read the SI of the serving cell, see e.g. 3GPP TS 45.008 v13.1.0. So when waking up in cell B it will reconfirm the BSIC and BCCH ARFCN combination and believe that it is still in cell A. If the MS has happened to move to a new routing area the MS will also not detect this, and will no longer be reached by paging messages sent in the earlier routing area. If an EC-GSM-IoT device attempts to access cell B it appends the BSIC to its Access burst. The BTS permits the access since the appended BSIC matches the one assigned to cell B, and the device may next receive an EC-Immediate Assignment (EC IA) message by the BTS. The EC IA assigns the MS a set of ARFCNs for its UL transfer using the MA_NUMBER IE, see e.g. 3GPP TS 44.018 v13.1.0. The ARFCNs associated with a certain MA_NUMBER is defined by Extended Coverage System Information (EC-SI), i.e. SI that may specific for devices that support EC-GSM-IoT Different associations may hence apply in cells A and B. A device waking up in a new cell after a long sleep may in worst case wake up, synchronize and reconfirm the BSIC of the earlier camped on cell, access and receive an assignment with a valid MA NUMBER associated with a set of ARFCNS assigned to the new cell. The device will not be aware of this change in MA NUMBER to ARFCN association and transmit on the ARFCNS associated with the assigned MA NUMBER in the cell it camped on before going to sleep. As a result the MS will fail its Temporary Block Flow (TBF) setup attempt. At the same time it will expose the network to unexpected interference when using an erroneous set of ARFCNs in its attempt to start an UL data transfer.

In case cell B is located in a different Routing Area (RA) than cell A and the MS there receives an assignment with a MA NUMBER, which it considers valid and which is mapped to the same frequency parameters in both cells, the transfer in cell B may be successful on the radio interface. The Packet Temporary Mobile Subscriber Identity and/or Temporary Logical Link Identifier (P-TMSI/TLLI) used during the transfer would then however not be assigned to that MS in the current Routing Area, where cell B is located, and may even there be assigned to another MS. This may thus e.g. lead to that the network receives data and/or messages from one MS with the identity of another MS.

Above, potential problems in the prior art relating to cell identity and a conventional BSIC have been identified and explained in some detail.

The present disclosure may briefly be summarized as relating to a set of solutions to these identified problems, e.g. attempting to solve problems with an ambiguity in cell identify caused by a short BSIC cell identifier, the desire to reduce the GSM frequency allocation, and the desire to optimize MS battery life through reduced monitoring requirements. For example, solutions of the present disclosure may briefly be summarized as relating to and may be implemented as:

1. An extension of the BSIC to make available a higher number of identifiers to be used in a cell plan to increase the unique combinations of BCCH ARFCN and BSIC identifiers. Embodiments herein are based on this solution.
2. A method to plan the EC BCCH and PEO Change mark Information elements in a GSM/EDGE network to improve the likelihood of reading the system information when waking up in a new cell to thereby detect a cell change.
3. A method to plan the MA NUMBER allocation in a GSM/EDGE network to reduce the likelihood of setting up an UL TBF in a new cell without understanding that the association between MA NUMBER and ARFCNs have changed.

4. An energy efficient procedure for triggering reading of system information to minimize the likelihood of failing to detect a cell change.

An advantage of the solutions outlined in the present disclosure is e.g. that a tighter frequency reuse can be supported in a GSM/EDGE network without the risk of introducing ambiguities in the cell identification leading to various drawbacks as indicated above.

The first solution above, that embodiments herein are based on, will first be described below. The other solutions will be separately described at the end under separate and labeled sections.

Figure 2:
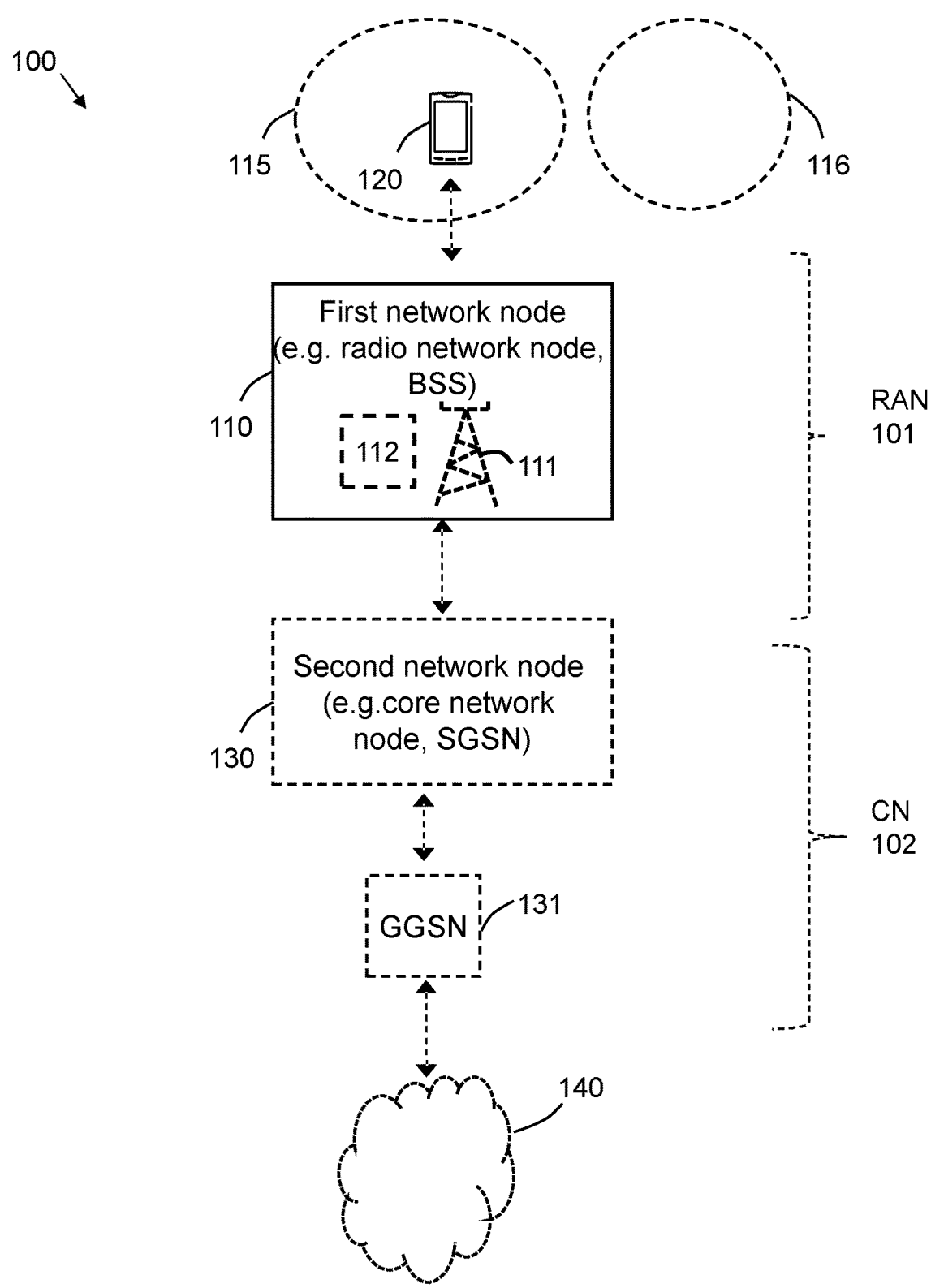

FIG. 2 is a schematic block diagram schematically depicting an example of a wireless communication network 100 in which embodiments and solutions herein may be implemented. The wireless communication network 100 is typically a telecommunication network or system, such as a cellular communication network that may be a GSM or a GSM based communication network that may be supporting EC-GSM-IoT. It may comprise a RAN 101 part and a core network (CN) 102 part.

A first network node 110, typically a radio network node, is shown comprised in the wireless communication network 100 and may thus be located in the RAN 101. The first network node 110 may be or be comprised in a Base Station Subsystem (BSS), e.g. such supporting GSM and/or GSM/EDGE, for example when the wireless communication network 100 is a GSM network or a GSM based communication network. The first network node 110 may be or comprise a base station 111, e.g. a Base Transceiver Station (BTS) of said BSS. The first network node 110 may further comprise a controlling node 112 of a base station, which may control one or more base stations, including e.g. the base station 111, and may be a Base Station Controller (BSC) of said BSS.

The wireless communication network 100, e.g. the first network node 110 thereof, may serve and/or control and/or manage one or more devices, e.g. MSs, such as a device 120, typically for wireless communication in the wireless communication network 100. Such device may be named e.g. a wireless communication device or simply a wireless device. The device 120 is thus supported by and/or operative in the wireless communication network 100.

The device 120 may be located and/or served in a cell 115 that may be provided by the first network node 110 or by another radio network node (not shown) of the wireless communication network 100. There may further be one or more other cells, e.g. a cell 116, e.g. in a neighborhood of the cell 115, which may be provided by the first network node 110 and/or by other one or more network nodes (not shown). If the cell 115 would correspond to the cell with the thick dashed border in FIG. 1, said one or more other cells could correspond to the other cells shown in FIG. 1 and cell 116 could e.g. correspond to any one of the cells with the thick solid borders in FIG. 1.

Further, a second network node 130, typically a core network node, may be comprised in the wireless communication network 100 and may thus be located in the CN 101. The second network node 130 may e.g. be a SGSN when the wireless communication network 100 is a GSM network or a GSM based communication network.

The communication device 120 may communicate with and/or via the second network node 130 over the first network node 110.

The CN 102 may further provide access for the wireless device to an external network 140, e.g. the Internet. The communication device 120 may thus communicate via the RAN 101 and the CN 102 with the external network 140.

When the wireless communication network 100 is a GSM network, or a GSM based communication network, the access to the external network is typically via a Gateway GPRS Support Node (GGSN), such as the GGSN 131 illustrated in the figure.

The wireless communication network 100 may support devices of two or more, different types and said one or more devices may be of these types. The types may differ in how they operate and are operated, and/or communicate, in the wireless communication network 100. The types may share infrastructure and resources in the wireless communication network 100 but some resources, e.g. certain channels and/or certain signaling, are typically specific and/or separate and/or configured differently for each type. A certain device, e.g. the device 120, may be of one or more types, i.e. operable and/or supporting communication as defined for these types in the wireless communication network 100. The device 120 may e.g. be of a first and/or second type of said one or more types. If e.g. only being of the first type or the second type, it may not be operable and/or be affected by resources, e.g. certain channels and/or certain signaling, that are specific for the other types. It is typically so that a device, although it may support many types, only is operable according to one type at a time.

A first type may e.g. be conventional, such as a legacy, type of GSM devices, such as smart phone supporting GSM. A second type may be a MTC type, i.e. a type specific for MTC devices as discussed elsewhere herein, and/or may be a type supporting EC-GSM-IoT and/or PEO as also discussed elsewhere herein.

The wireless communication network 100 may further support and/or serve extended DRX (eDRX), including e.g. paging reachability of devices that support and/or operate according to eDRX. The eDRX may be considered as a DRX with cycles that has been extended compared to cycles of a another, such as conventional or legacy, DRX that also may be associated with, e.g. supported by, the wireless communication network 100 and/or a RAT thereof. When the wireless communication network supports eDRX, it may support extended paging cycles and/or longer duration between possible paging occasions, e.g. longer periods of unreachability, compared to conventionally, e.g. compared to paging cycles and paging occasions of said another DRX. The eDRX may be specific for the second type of devices.

Moreover, the device 120, and this may be specific for devices of the second type and may be a result from the device 120 being of the second type, may operate or is operable in a mode where it can be in an unreachable state and in a reachable state, e.g. so that it is in any of said states and/or over time changes between said states. In the reachable state the device is reachable by the network or in other words the network may reach the device by wireless communication and e.g. deliver data to the device, i.e. downlink data. This is typically not possible in the unreachable state. The device may cycle between the states. The unreachable state may correspond to a "deep sleep" state, e.g. if/when the device operate or is operable in eDRX mode, and/or to a power saving state, e.g. when/if the device operate or is operable in a Power Saving Mode (PSM) or similar. In the unreachable state the device may not even be reachable by paging messages, but this may be the case in the reachable mode.

The device 120 may change to and/or from, such as between said states according to a certain and/or nominal and/or conventional, scheme or procedure that may be predefined and/or predetermined, and that may be affected by one or more parameters set by the wireless communication network.

During at least a certain period when in the reachable state, the device may be reachable by and can receive downlink data. The downlink data may e.g. be paging message(s) and/or data directed to the device as such, e.g. specific for the device and/or specific for an application operating on the device, i.e. may be application specific data, and/or so called Mobile Terminated (MT) downlink data.

Attention is drawn to that FIG. 2 is only schematic and for exemplifying purpose and that not everything shown in the figure may be required for all embodiments herein, as should be evident to the skilled person. Also, a wireless communication network or networks that in reality correspond(s) to the wireless communication network 100 will typically comprise several further network nodes, such as base stations, etc., as realized by the skilled person, but which are not shown herein for the sake of simplifying.

In a conventional GSM/EDGE network, there is a six bit BSIC is based on a three bit Network Color Code (NCC) identifying the PLMN and a three bit Base station Color Code (BCC) identifying a cell, e.g. corresponding to the cell 115. To cater for a deployment where a tight frequency reuse is supported and/or Network sharing is in place embodiments herein may be considered based on an idea to introduce a new N bit field, i.e. an additional set of bits, that may be, and in the following is, denoted ARFCN Color Code (ACC).

The ACC is intended to support discrimination between cells using the same NCC, BCC and BCCH ARFCN, i.e. to be able to discriminate between the cells discussed above in connection with FIG. 1. Together the three fields NCC, BCC, ACC may create a new 6+N bit identifier that may be denoted an extended BSIC (eBSIC) and thus forms a new BSIC that comprises the conventional BSIC.

The following may be specific for EC-GSM-IoT, such as when the device 120 operate according to EC-GSM-IoT in the wireless communication network 100 being a GSM/EDGE network.

In the downlink, the eBSIC typically needs to be broadcasted to the device 120 on a logical channel reaching to the edge of the cell 115. In case of EC-GSM-IoT the co called Extended Coverage Synchronization CHAnnel (EC-SCH) is a suitable choice since it's decoded as part of the cell synchronization, and it is designed as a single burst block meaning that it can be read by a device in an energy efficient manner.

Figure 3:
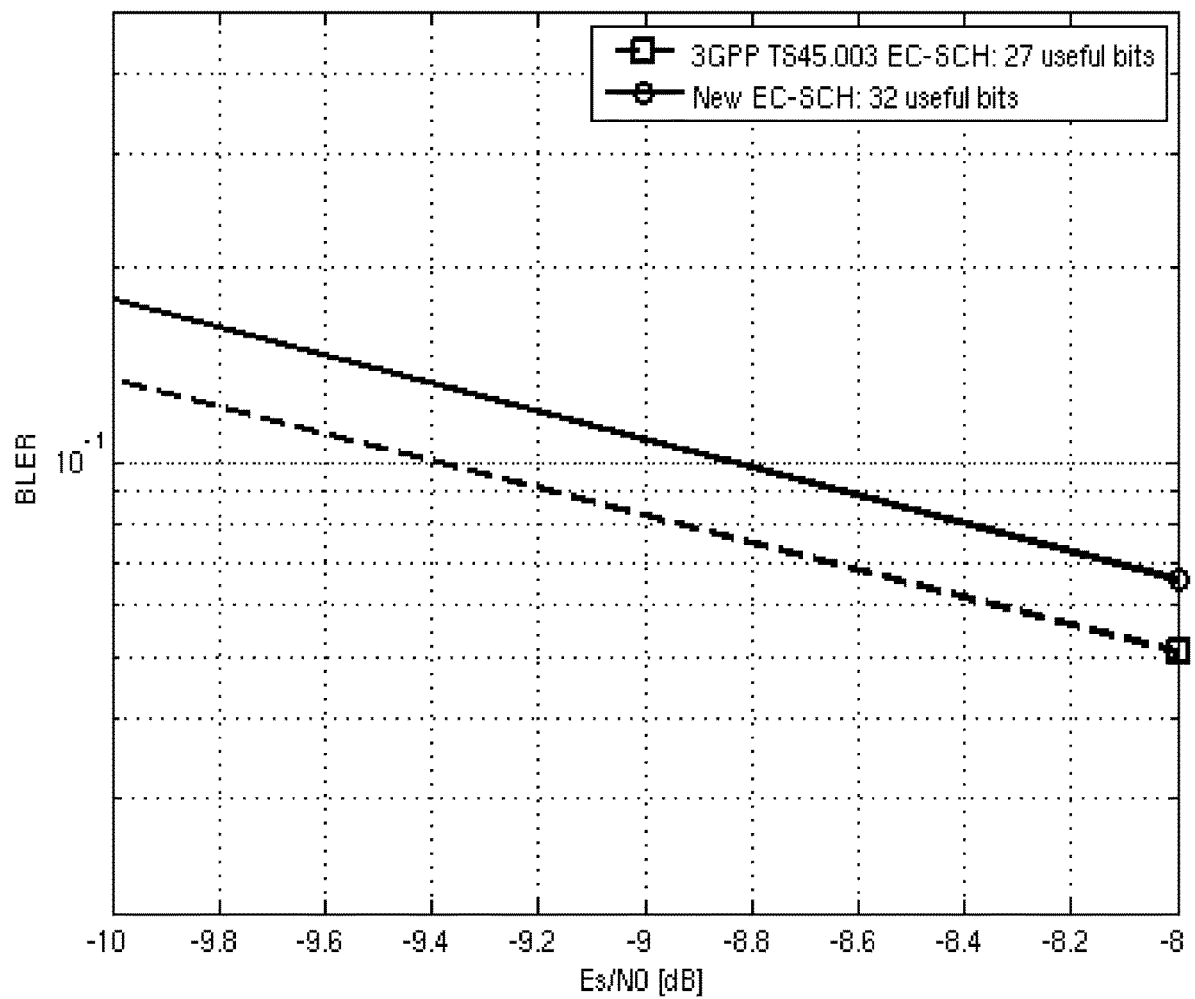

A EC-SCH that has been discussed for EC-GSM-IoT conveys 27 useful bits. 25 of those are data bits encoded with a CRC followed by a convolutional code. The remaining 2 bits are implicitly signaled via the used EC-SCH interleaving pattern, see e.g. 3GPP TS 45.003 v13.1.0. One of the 25 data bits is unused, it's a so called spare bit, and this bit could be used to implement a single bit ACC, or possibly a part of the N bit ACC. To fit an ACC that is N bit long into the EC-SCH, the number of data bits to be encoded can instead be extended from 25 to 25+N, or 25+N−1 if the spare bit is used for a part of the ACC, followed by the introduction of a puncturing pattern after the convolutional encoder to end up with the same number of bits mapped to the synchronization burst, as in legacy GSM, and the current proposal for EC-GSM-IoT. FIG. 3 presents an example of EC-SCH performance when extending the number of useful bits from 27 up to 32. It is shown that the five additional bits can be added with less than 1 dB degradation in BLER performance. FIG. 3 thus shows EC-SCH sensitivity performance when extending the payload content from 25 bits to 32 bits.

Figure 4:
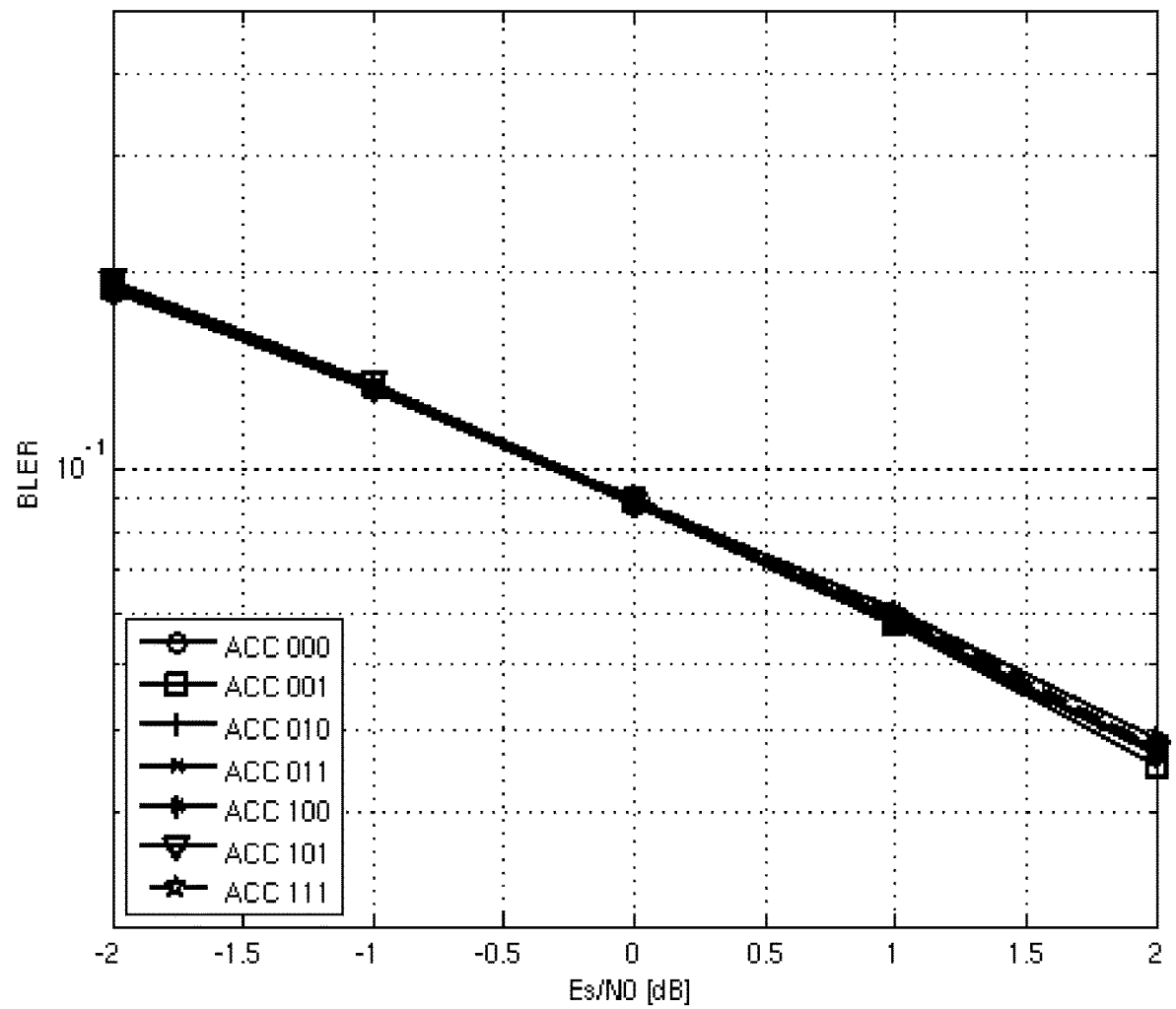

The eBSIC may need to be echoed back over the EC-RACH when a device, e.g. the device 120, makes an attempt to access the network in order for the wireless communication network 100 to know that the access is coming from a device that is in the cell 115. The NCC and BCC are in the current design added modulo two over the CRC bits of the EC-RACH, see e.g. 3GPP TS 45.003 v13.1.0 as mentioned above. The N ACC bits can reuse the same concept and be added modulo two e.g. over the N last data bits of the EC-RACH. FIG. 4 presents an example of the performance when adding a three bit ACC to the EC-RACH. FIG. 4 shows EC-RACH Coverage Class 1 sensitivity performance when adding three ACC bits modulo two over the three last data bits of the EC-RACH. As can be seen, the impact on performance is negligible from introducing a three bit ACC, and this regardless of the NCC configuration. Here it can be noted that the performance for ACC=000 equals the performance for the reference case where no ACC is applied to the EC-RACH.

Figure 5:
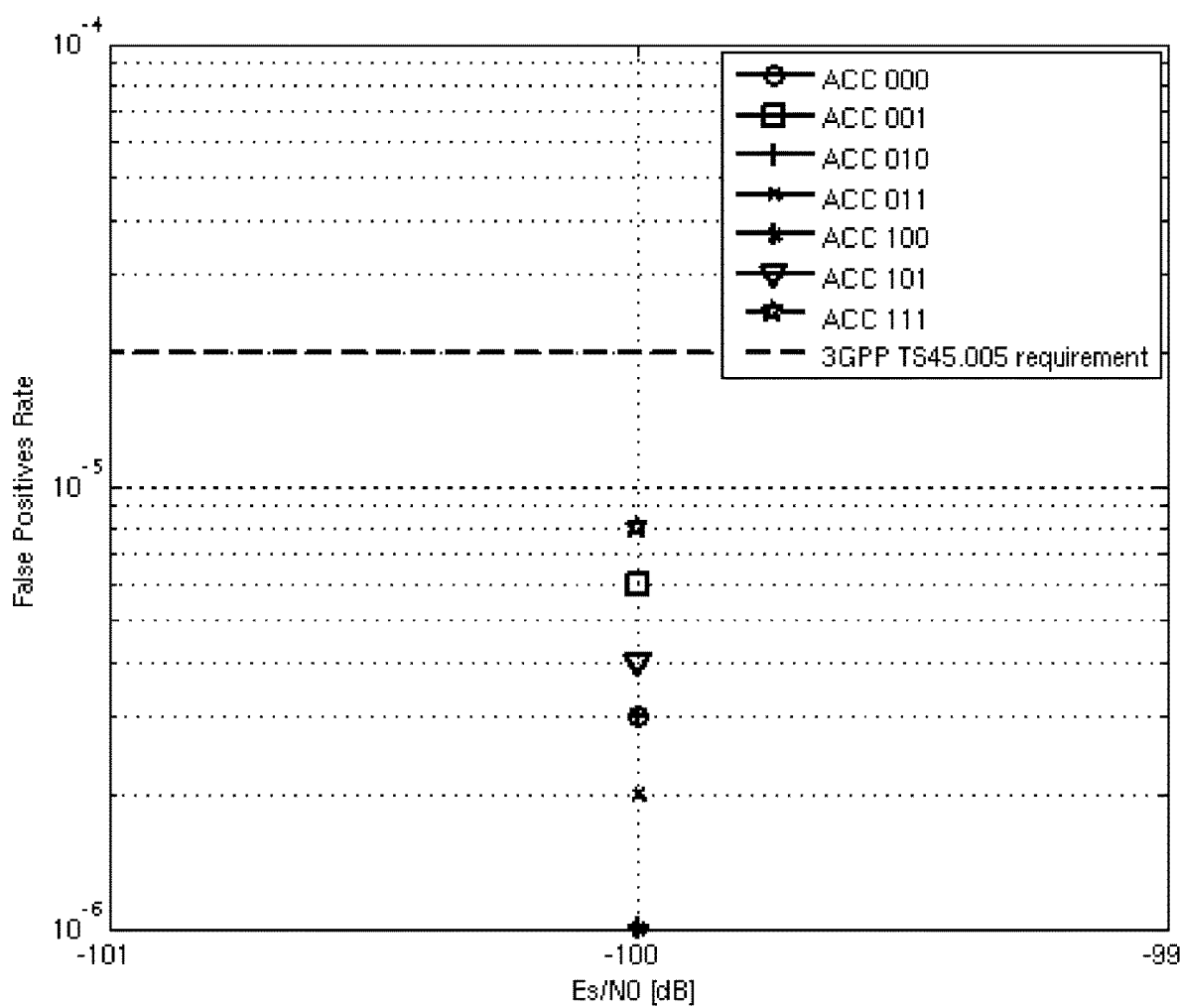

FIG. 5 presents the false positive performance when feeding the receiver with a signal at SNR −100 dB, i.e. approximating random input. FIG. 5 shows EC-RACH false positive performance when feeding the receiver with a signal at SNR −100 dB, i.e. approximating random input. The EC-RACH may be required to fulfill a false positive requirement of 0.002%, see the black dashed line, when exposed to random input, see e.g. 3GPP TS 45.005 v13.0.0. As can be seen, the limit of 0.002% is comfortable achieved.

In contrast to the above section, the following may be specific for Non-EC-GSM-IoT, such as when the device 120 operate according to EC-GSM-IoT in the wireless communication network 100 when it is a GSM/EDGE network.

For GSM/EDGE features relying on synchronization using the legacy SCH synchronization channel, i.e. the conventional SCH used in GSM, it will typically not be possible to add the ACC to the NCC and BCC sent on the SCH as the SCH has no spare bits available and modifications as the one proposed above for the EC-SCH would break the backwards compatibility towards existing mobile implementations.

Instead either the messages sent over the Broadcast Control CHannel (BCCH), the Paging CHannel (PCH) and/or Access Grant CHannel (AGCH) can be extended e.g. with a new Information Element containing either the full eBSIC, or only the ACC. The device 120 may then be required to, after synchronizing to a cell, e.g. the cell 115, via the SCH, where it reads the BSIC, continue and confirm the ACC part, or the full eBSIC, via a reading of the BCCH, PCH or AGCH.

This proposal for the BCCH, PCH and/or AGCH can also be applied to the EC-GSM-IoT EC channels known as EC-BCCH, EC-PCH and EC-AGCH. The above proposal for EC-GSM-IoT to echo the full eBSIC in the RACH is also possible in this case, with the drawback that the wireless communication network 100 may not know if the BSIC has been received from a device using only BSIC, i.e. the conventional 6 bit BSIC, or a device using eBSIC. The BTS, e.g. BTS of the first network node 110, may hence have to attempt to decode the message on the RACH assuming both options being possible. To minimize risk of false detection the BTS could correlate the use of eBSIC with the content of the actual message. For example, consider that eBSIC is only introduced for PEO devices. PEO is the feature mentioned above with similar properties as EC-GSM-IoT but without the component of extended coverage. In this case, PEO devices may use a specific code point in the message sent on the RACH to indicate that they are PEO capable. Hence, it would only be allowed for the BTS to accept a detected eBSIC in case the PEO code point is provided in the actual message, i.e. when a device operating according to PEO has been identified.

Figure 6:
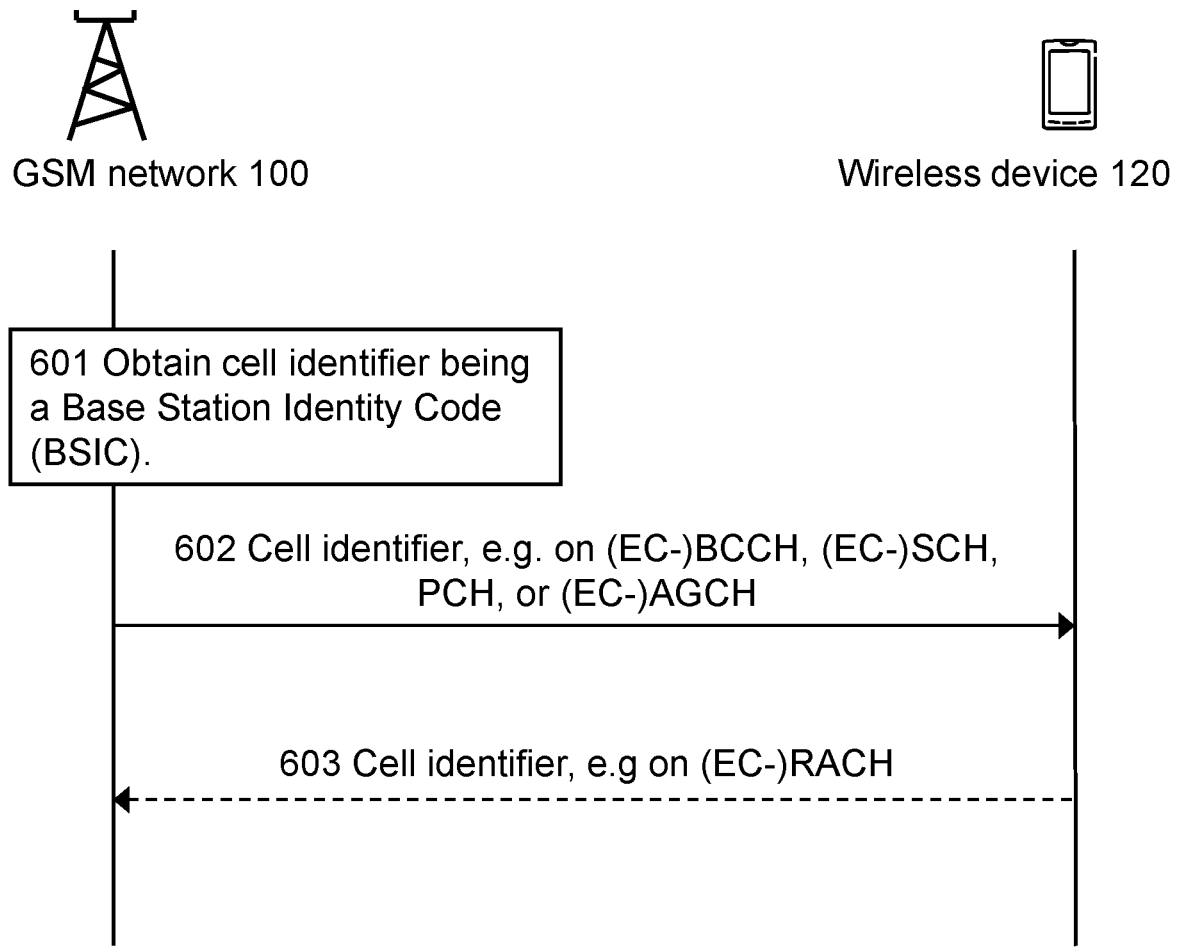

FIG. 6 depicts a combined signaling diagram and flowchart, which will be used to discuss embodiments herein. The involved nodes, as shown in the figure is the wireless communication network 100, typically a GSM network, and that may be exemplified by the first network node 110, at least in some embodiments, and the device 120, e.g. a MS.

The methods and actions discussed in the following are for managing a cell identity of a cell, e.g. the cell 115, in the wireless communication network 100, which cell identity is directed to devices, e.g. the device 120, served in the wireless communication network 100, e.g. so that such device 120 can identify the cell 115 and e.g. identify that the device is located in or nearby, e.g. within coverage of, the cell being identified.

Note that shown actions may be taken in any suitable order and/or be carried out fully or partly overlapping in time when this is possible and suitable. Dotted lines attempt to illustrate features that are not present in all embodiments.

Action 601

The wireless communication network 100, e.g. the first network node 110, obtains, e.g. receives from another node or retrieving internally, a cell identifier for identifying said cell 115 and that preferably is based on, e.g. comprises or is, a Base Station Identity Code (BSIC) that may correspond to the eBSIC discussed above. An operator of the wireless communication network may have assigned the eBSIC, i.e. the obtained BSIC in this case, to the cell 115, or at least influence how the BSIC is assigned. Although the eBSIC have more bits than a conventional 6 bits BSIC, the assignment and how the eBSIC is obtained can be similar as conventionally. The cell identifier is thus identifying the cell 115. The cell identifier preferably comprises, e.g. is formed by, at least three, different sets, such as fields, of bits, i.e. bit sets, where each bit set may be associated with a specific and/or different characteristic or meaning, e.g. for denoting, e.g. coding, an identity in a certain group of wireless communication networks and/or channels and/or frequencies and/or cells and/or base stations.

For example: One of the bit sets may be a three bit code and/or may be associated with a Network Color Code (NCC) that may correspond to the NCC discussed above. One of the bit sets may be another three bit code and/or may be associated with a Base station Color Code (BCC), identifier that may correspond to the BCC discussed above. The BCC and NCC may be thus be as in the prior art, e.g. as described in 3GPP TS 23.003 v. 13.0.0.

Further, another one of said bit sets may a N bit long code, N>0, and may be denoting an identity within a certain frequency, frequencies and/or a channel, such as a BroadCast CHannel (BCCH) and may correspond to the ACC discussed above. For convenience, this this bit set may be referred to as the "N bits set" or simply "ACC" in the following since this bit set may be associated with and/or identifying an Absolute Radio Frequency Channel Number (ARFCN) Color Code, i.e. ACC. The ACC may be for and/or denoting an identity within one and the same ARFCN, or more general, for denoting and/or coding an identity within a certain frequency, frequencies and/or a channel, such as a Broadcast CHannel (BCH). The BCH may be assigned a number or identity corresponding to, or that is, a ARFCN and thus the ACC may be denoting, or coding, an identity within one and the same ARFCN. For example, if multiple cells and/or base stations use the same BCH frequency and/or ARFCN, each of these cells and/or base stations should for that BCH and/or ARFCN preferably have been assigned and/or be identified by a unique ACC or at least eBSIC. As already mentioned, the ACC together with the two other bit sets may correspond to or form said extended BSIC (eBSIC) that thus may be e.g. 6+N bits long.

Action 602

The wireless communication network 120 sends, i.e. transmits, e.g. broadcasts, the cell identifier in the cell 115 so that it is receivable in the cell by said devices, e.g. the device 120, so that a receiving device can identify the cell and thereby e.g. be informed that the receiving device is located in or nearby, e.g. within coverage of, the cell 115. It is preferably the first network node 110, e.g. BSS in the case of GSM, that sends the cell identifier. The device 100 receives the cell identifier.

The cell identifier, at least partly, may be sent on, or over, a channel, i.e. a downlink channel, that may be a Synchronization CHannel (SCH), e.g. a SCH that is specific for said second type of devices, e.g. EC-GSM-IoT operative devices. Such SCH may be named an Extended Coverage SCH (EC-SCH). The ACC, or at least part thereof, may be comprised in one or more data bits of said EC-SCH that are encoded with a CRC followed by a convolutional code. Said one or more data bits may be specific for the ACC and e.g. have no other purpose, they may e.g. else, at least partly, be so called spare bit(s) and/or be bit(s) that have been added with the purpose to carry ACC. A result after application of the convolutional code may be transformed, e.g. by using a so called puncturing pattern, so that the result after convolutional encoding is the same number of bits as it would be without said one or more data bits specific for the ACC being convolutional encoded, such as in a conventional or legacy case, such as in the case of devices that are not of the second type.

Alternatively or additionally, the cell identifier, at least partly, e.g. the ACC or part thereof, may be sent on, or over, one or more channels, i.e. downlink channel(s), that may be a Broadcast Control CHannel (BCCH), Paging CHannel, (PCH), and/or Access Grant CHannel (AGCH). More specifically, the cell identifier, at least partly, e.g. the ACC or part thereof, may be comprised in information, e.g. one or more messages, sent over such channel(s), e.g. comprised in an information element of the message, which information element may be specifically for carrying the cell identifier, at least partly, e.g. the ACC or part thereof. The BCCH and/or PCH and/or AGCH may be such that are specific for said second type of devices. These channels may be named "EC-BCCH", "EC-PCH", and "EC-AGCH", respectively.

Action 603

The device 120 sends to the wireless communication network 100, typically the first network node 110, the cell identifier in response to receipt of the cell identifier in the previous action. The wireless communication network 100, such as the first network node 110, receives the cell identifier.

This action may be referred to as the device 120 is echoing back the cell identifier.

The cell identifier may be sent on a channel, i.e. an uplink channel, such as a Random Access Channel (RACH), e.g. a RACH that is specific for said second type of devices, e.g. EC-GSM-IoT devices. Such RACH may be named an Extended Coverage RACH (EC-RACH).

Figure 7:
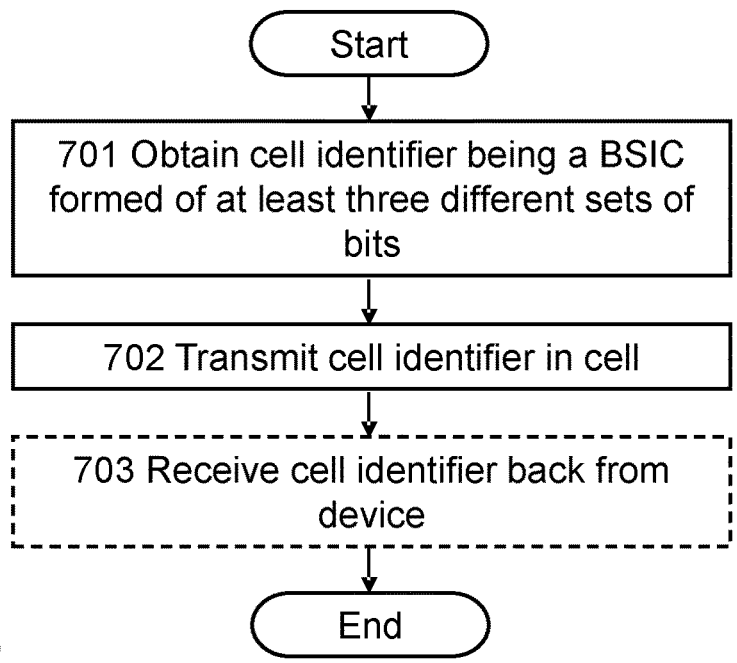

FIG. 7 is a flow chart schematically illustrating embodiments of a first method, performed by a network node of a GSM network. In the following, the network node is exemplified by the first network node 110 and the GSM network by the wireless communication network 100. The first method is for managing a cell identity of a cell in the wireless communication network 100, which cell identity is directed to devices, including e.g. the device 120, configured to be served in the wireless communication network 100. The cell is exemplified by the cell 115 in the following.

The first method comprises the following actions, which actions may be taken in any suitable order and/or be carried out fully or partly overlapping in time when this is possible and suitable.

Action 701

The first network node 110 obtains a cell identifier for identifying said cell 115 which cell identifier is a Base Station Identity Code (BSIC) coding an identity of the cell 115 and being formed of at least three sets of bits: A first three bits set thereof being a Network Color Code (NCC), e.g. as discussed above and thus may be a conventional NCC in GSM. A second three bits set thereof being a Base Station Color Code (BCC) e.g. as discussed above and thus may be a conventional BCC in GSM. An additional, third set thereof comprising one or more bits, i.e. an additional sets of bits than in the case of a conventional BSIC in GSM. The third bit set may correspond to the ACC discussed elsewhere herein. Typically the identity is within a group of cells, i.e. identifies the cell 115 within this group, which typically is a group of cells, e.g. including the cells 115 and 116, that use the same frequency of their Broadcast Channels (BCHs).

This action may fully or partly correspond to action 601 as described above.

Action 702

The first network node 110 transmits the cell identifier in the cell 115 so that the cell identifier is receivable by said devices, e.g. the device 120, and the cell 115 thereby can be identified by said devices.

In some embodiments, at least part of the cell identifier is transmitted on one or more of the following: a Synchronization Channel (SCH) and an Extended Coverage SCH (EC-SCH), which EC-SCH is a SCH that is specific for devices supporting Extended Coverage GSM Internet of Things (EC-GSM-IoT). In some embodiments, at least said third set is transmitted on one or more of the following: a Broadcast Control CHannel (BCCH), a Paging CHannel (PCH), and an Access Grant CHannel (AGCH).

This action may fully or partly correspond to action 602 as described above.

Action 703

The first network node 110 may receive the cell identifier back from a device, e.g. the device 120, in response to that that the device has received the transmitted cell identifier in Action 702.

In some embodiments, the cell identifier is received on one or more of the following: a Random Access CHannel (RACH) and an Extended Coverage RACH (EC-RACH), which EC-RACH is a RACH that is specific for devices supporting Extended Coverage GSM Internet of Things (EC-GSM-IoT).

This action may fully or partly correspond to action 603 as described above.

Figure 8:
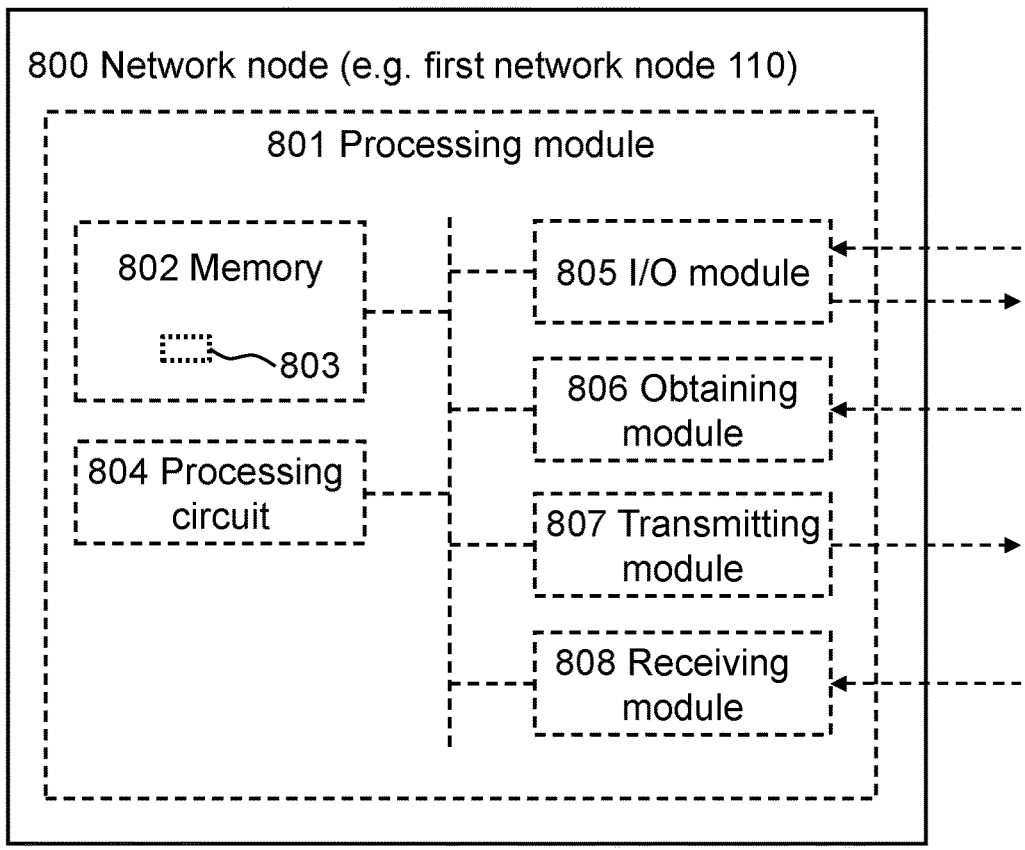

FIG. 8 is a schematic block diagram for illustrating embodiments of how a network node 800, that e.g. may be the first network node 110, may be configured to perform the method and actions discussed above in connection with FIG. 7.

Hence, the network node 800 is for managing a cell identity of a cell, e.g. the 115, in the GSM network, e.g. the wireless communication network 100, that the network node 800 is configured to be comprised in. The cell identity is directed to devices, e.g. the device 120, configured to be served in the wireless communication network 100.

Thus, the network node 800 may comprise:

A processing module 801, such as a means, one or more hardware modules, including e.g. one or more processors, and/or one or more software modules for performing said methods and/or actions.

A memory 802, which may comprise, such as contain or store, a computer program 803. The computer program 803 comprises 'instructions' or 'code' directly or indirectly executable by the respective network node so that it performs the said methods and/or actions. The memory 802 may comprise one or more memory units and may be further be arranged to store data, such as configurations and/or applications involved in or for performing functions and actions of embodiments herein.

A processing circuit 804 as an exemplifying hardware module and may comprise or correspond to one or more processors. In some embodiments, the processing module 801 may comprise, e.g. 'is embodied in the form of' or 'realized by' the processing circuit 804. In these embodiments, the memory 802 may comprise the computer program 803 executable by the processing circuit 804, whereby the network node 800 comprising it is operative, or configured, to perform said method and/or actions.

An Input/Output (I/O) module 805, configured to be involved in, e.g. by performing, any communication to and/or from other units and/or nodes, such as sending and/or receiving information to and/or from other external nodes or devices. The I/O module may be exemplified by an obtaining, e.g. receiving, module and/or a sending module, when applicable.

The network node 800 may also comprise other exemplifying hardware and/or software module(s), which module(s) may be fully or partly implemented by the processing circuit 804. For example, the network node 800 may further comprise an obtaining module 806 and/or a transmitting module 807 and/or an receiving module 808.

Hence, the network node 800 and/or the processing module 801 and/or the processing circuit 804 and/or the I/O module 805 and/or the obtaining module 806, are operative, or configured, to obtain said cell identifier.

Further, the network node 800 and/or the processing module 801 and/or the processing circuit 804 and/or the I/O module 805 and/or the transmitting module 807, are operative, or configured, to transmit the cell identifier in the cell 115 so that the cell identifier is receivable by said devices, e.g. the device 120.

In some embodiments, the network node 800 and/or the processing module 801 and/or the processing circuit 804 and/or the I/O module 805 and/or the receiving module 808, are thus operative, or configured, to receive the cell identifier from a device, e.g. the device 120, in response to that that the device 120 has received the transmitted cell identifier.

Figure 9:
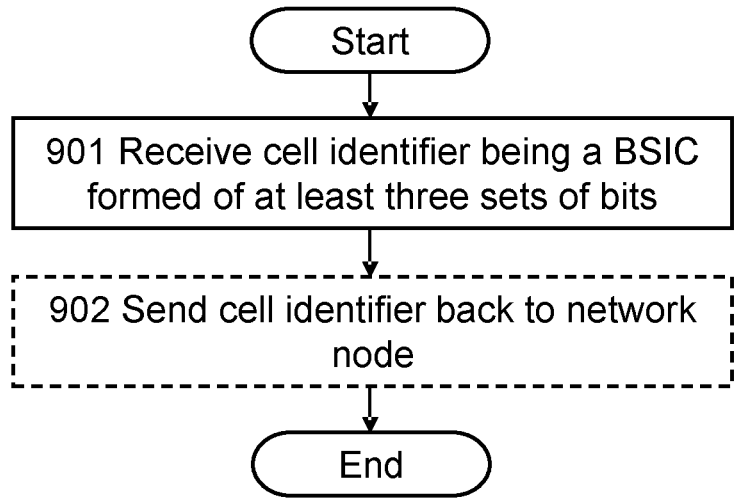

FIG. 9 is a flow chart schematically illustrating embodiments of a second method, performed by a device, for managing a cell identity of a cell in a GSM network. In the following, the device is exemplified by the device 120, the cell by cell 115 and the GSM network by the wireless communication network 100.

The second method comprises the following actions, which actions may be taken in any suitable order and/or be carried out fully or partly overlapping in time when this is possible and suitable.

Action 901

The device 120 receives, from a network node, e.g. the first network node 110, comprised in the wireless communication network 100, a cell identifier for identifying said cell 115. The cell identifier is a Base Station Identity Code (BSIC) coding an identity of said cell 115 and being formed of at least three sets of bits: A first three bits set thereof being a Network Color Code (NCC), e.g. as discussed above and thus may be a conventional NCC in GSM. A second three bits set thereof being a Base Station Color Code (BCC) e.g. as discussed above and thus may be a conventional BCC in GSM. An additional, third set thereof comprising one or more bits, i.e. an additional sets of bits than in the case of a conventional BSIC in GSM. The third bit set may correspond to the ACC discussed elsewhere herein. Typically the identity is within a group of cells, i.e. identifies the cell 115 within this group, which typically is a group of cells, e.g. including the cells 115 and 116, that use the same frequency of their Broadcast Channels (BCHs).

In some embodiments, at least part of the cell identifier is received on one or more of the following: a Synchronization Channel (SCH) and an Extended Coverage SCH (EC-SCH), which EC-SCH is a SCH that is specific for devices supporting Extended Coverage GSM Internet of Things (EC-GSM-IoT).

In some embodiments, at least said third set is transmitted on one or more of the following: a Broadcast Control CHannel (BCCH), a Paging CHannel (PCH), and an Access Grant CHannel (AGCH).

This action may fully or partly correspond to action 602 as described above.

Action 902

The device 120 may send the received cell identifier back to the network node, i.e. the network node that it was received from, e.g. the first network node 110.

In some embodiments, the cell identifier is sent back on one or more of the following: a Random Access CHannel (RACH) and an Extended Coverage RACH (EC-RACH), which EC-RACH is a RACH that is specific for devices supporting Extended Coverage GSM Internet of Things (EC-GSM-IoT).

This action may fully or partly correspond to action 603 as described above.

Figure 10:
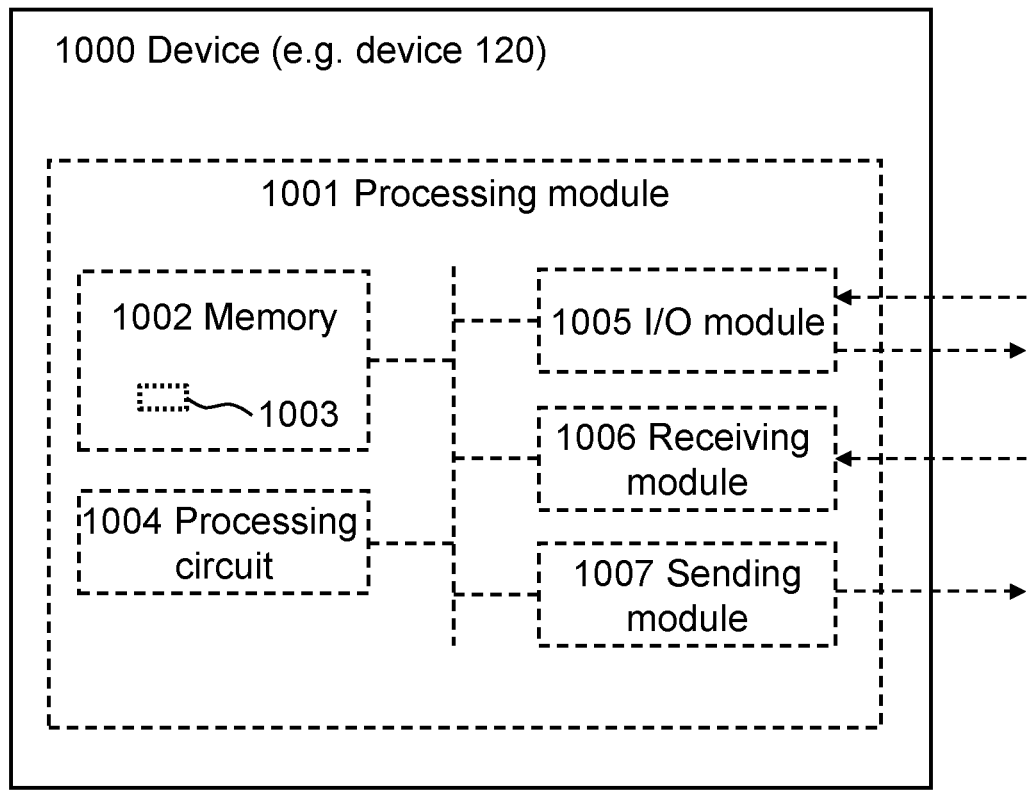

FIG. 10 is a schematic block diagram for illustrating embodiments of how a device 1000, that e.g. may be the device 110, may be configured to perform the method and actions discussed above in connection with FIG. 9.

Hence, the device 1000 is for managing said cell identity of a cell, e.g. the cell 115, in the GSM network, e.g. the wireless communication network 100.

Thus, the device 1000 may comprise:

A processing module 1001, such as a means, one or more hardware modules, including e.g. one or more processors, and/or one or more software modules for performing said methods and/or actions.

A memory 1002, which may comprise, such as contain or store, a computer program 1003. The computer program 1003 comprises 'instructions' or 'code' directly or indirectly executable by the respective network node so that it performs the said methods and/or actions. The memory 1002 may comprise one or more memory units and may be further be arranged to store data, such as configurations and/or applications involved in or for performing functions and actions of embodiments herein.

A processing circuit 1004 as an exemplifying hardware module and may comprise or correspond to one or more processors. In some embodiments, the processing module 1001 may comprise, e.g. 'is embodied in the form of' or 'realized by' the processing circuit 1004. In these embodiments, the memory 1002 may comprise the computer program 1003 executable by the processing circuit 1004, whereby the device 1000 comprising it is operative, or configured, to perform said method and/or actions.

An Input/Output (I/O) module 1005, configured to be involved in, e.g. by performing, any communication to and/or from other units and/or nodes, such as sending and/or receiving information to and/or from other external nodes or devices. The I/O module 1005 may be exemplified by an obtaining, e.g. receiving, module and/or a sending module, when applicable.

The device 1000 may also comprise other exemplifying hardware and/or software module(s), which module(s) may be fully or partly implemented by the processing circuit 1004. For example, the device 1000 may further comprise an receiving module 1006 and/or a sending module 1007.

Hence, the device 1000 and/or the processing module 1001 and/or the processing circuit 1004 and/or the I/O module 1005 and/or the receiving module 1006, are operative, or configured, to receive, from the network node, e.g. the first network node 110, said cell identifier.

In some embodiments, the device 1000 and/or the processing module 1001 and/or the processing circuit 1004 and/or the I/O module 1005 and/or the sending module 1007, may thus be operative, or configured, to send the received cell identifier back to the network node, e.g. the first network node 110.

The following labelled sections refer to the further solutions 2-4, respectively, that were listed and numbered above. Each of these sections may thus be considered to relate to a set of examples of the respective solution. However, please note, as will be recognized by the skilled person, that the sections may benefit or even be needed to be read as a whole and not entirely separated from the above and each other since some information may be shared there between. For example may some information discussed for some embodiments above or in the examples below, be used and referred to in the description of another solution and/or example.

Note that any actions in discussed in the following may be taken in any suitable order and/or be carried out fully or partly overlapping in time when this is possible and suitable.

Solution 2—"BCCH Change Mark Network Planning"

For EC-GSM-IoT, or simply EC-GSM, a three bit EC BCH Change Mark is typically sent on the EC-SCH. It indicates changes in the EC-GSM-IoT System Information, which may be named EC SI, broadcasted in the cell. EC SI refers to SI that is directed to devices operating according to EC-GSM-IoT. If the three bits are initially configured as a bit map 000, a single change in the SI will increase the value of the bitmap one step to 001. When a MS detects a bit toggle in the change mark it will re-read the EC SI. So in case a MS enters sleep mode in cell A and wakes up in a cell B configured with the same BSIC and BCH ARFCN combination then it will believe it is still in the same cell. However, if the EC-BCH Change Mark in cell A and cell B differs, this will trigger the MS to read the EC SI, and read the therein contained two byte Cell ID and/or Location Area and Routing Area information so that the MS can detect that it has entered a new cell.

In case the EC BCH Change Mark is identical in cell A and cell B the MS may fail to detect that it has entered a new cell. This is especially a risk in the beginning of the life time of a deployed system where no changes have been made to the SI configuration. It is also a risk in case coordinated updates to the SI across an entire NW, triggering correlated updates of the EC BCH Change Mark across the NW.

The likelihood of experiencing the same EC BCH Change mark bitmap in two cells configured with the same BCH ARFCN and BSIC can be reduced in case it is secured that the EC BCH Change mark starting bit map is planned across the network. If mentioned Cell A has an EC BCH Change mark bit map of 000 and the Cell B has a bit map of 111 a MS moving between the two cells will be triggered to read the SI and hence understand that it has moved to a new cell.

The same methodology may also apply to the PEO feature when the PEO BCH Change Mark IE is broadcasted in the PCH and AGCH.

An MS that detects a change in the EC BCH Change mark bitmap will read the EC-SI_CHANGE_MARK, contained in the EC-SI in order to detect what parts of the EC-SI that have been updated. The MS will thus only read the parts of the EC-SI that are indicated with a different value in the EC-SI_CHANGE_MARK. The BCH Change Mark planning may thus include a planning of the EC-SI_CHANGE_MARK field in different cells. As an option, the MS could be mandated to always read the EC-SI containing the Cell ID and the Location Area and Routing Area information (EC-System Information Type 2) when a change in the EC BCH Change mark bitmap is detected.

This is referred to as BCH Change Mark network planning and can be used to minimize the effects of BSIC confusion from the MS side. It will not have impact to a standard document but would be an implementation option for the network vendor to avoid the above mentioned BSIC confusion effect.

Figure 11:
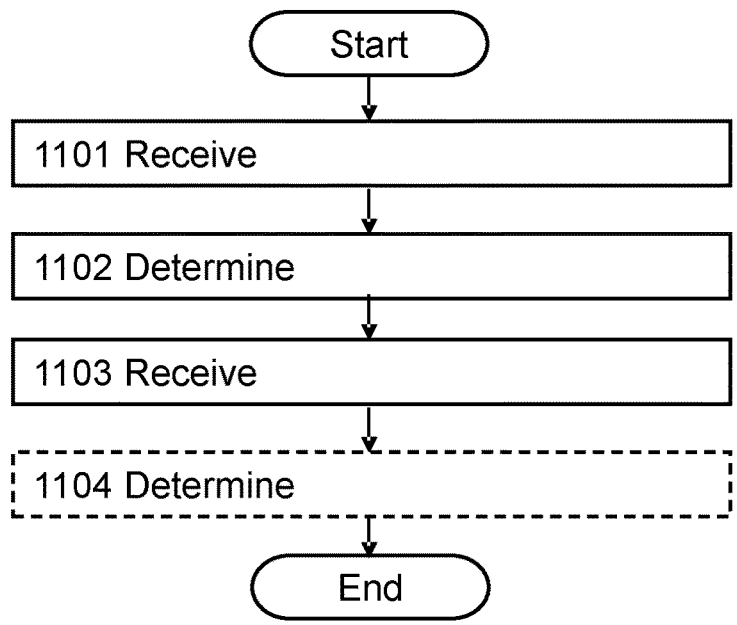

FIG. 11 is a flow chart schematically illustrating embodiments of a third method, relating to the second solution.

The third method is performed by a device, e.g. the communication device 120, for managing identity of a cell, e.g. the cell 115, in a wireless communication network, such as the wireless communication network 100.

The cell identity may such as described above, e.g. be directed to devices, e.g. the communication device 120, served in the wireless communication network, e.g. so that such device can identify the cell and e.g. that the device is located in or nearby, e.g. within coverage of, the cell being identified.

Figure 12:
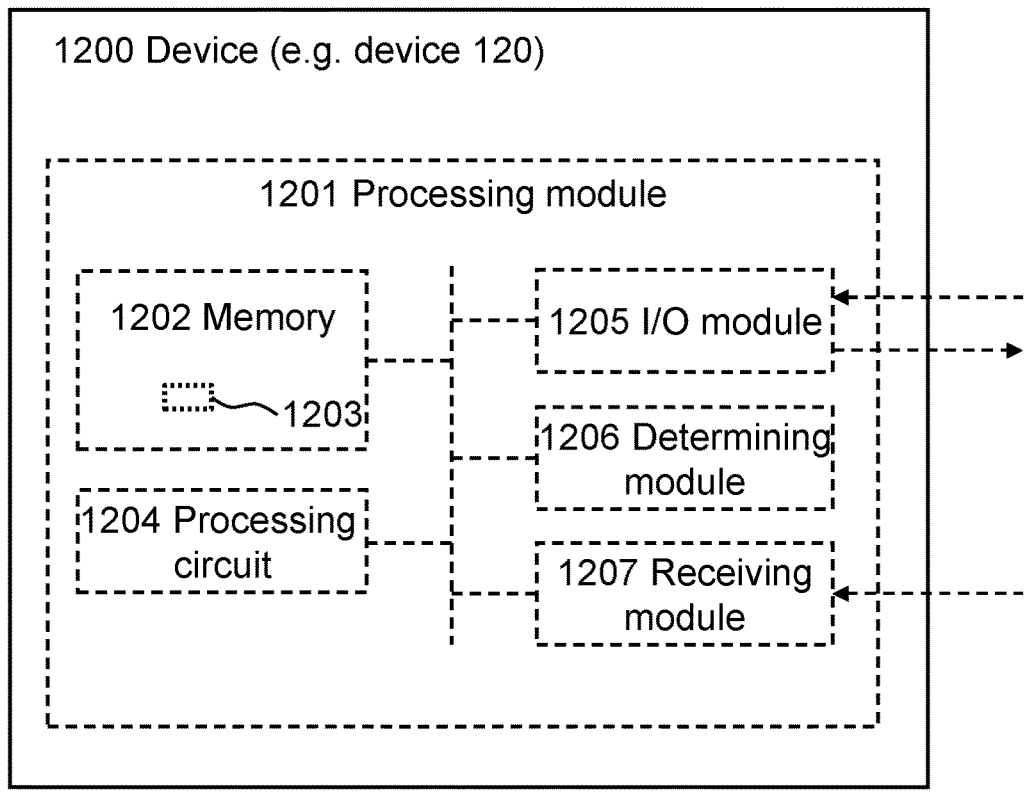

FIG. 12 is a schematic block diagram for illustrating embodiments of how a device 1200, that e.g. may be the device 110, may be configured to perform the third method and actions discussed below and shown in FIG. 11.

The processing module 1201, the memory 1202, the computer program 1203, the processing circuit and the Input/Output (I/O) module 1205, may correspond to and thus correspondingly function as and be correspondingly configured as their respective counterparts that were discussed above in connection with FIG. 10.

The third method comprises the actions of:

Receiving 1101, from the wireless communication network, e.g. the first network node 110, first information regarding the cell identity. The first information regarding the cell identity may be based on, e.g. comprise, a cell identifier for identifying said cell and that preferably is based on, e.g. comprises or is, a Base Station Identity Code, "BSIC". The cell identifier is thus for identifying a cell, or at least a base station providing the cell, in the wireless communication network. The cell identifier may comprise, e.g. be formed by, two different sets, such as fields, of bits as described above, e.g. the NCC and the BCC. Further, the information regarding the cell identity may be based on, e.g. comprise, a number for identifying an Absolute Radio Frequency Channel Number, "ARFCN" and/or for identifying a certain frequency, frequencies and/or a channel, such as a Broadcast CHannel, "BCH". The BCH may be assigned a number or identity corresponding to, or that is, the ARFCN. An assumption, at least conventionally, may be that the cell is uniquely identified by the BSIC for the same ARFCN. The first information regarding the cell identity may thus be based on, such as comprise or consist, of a BCH ARFCN, i.e. ARFCN associated with a BCH, and BSIC.

The device 1200 and/or the processing module 1201 and/or the processing circuit 1204 and/or the I/O module 1205 and/or the receiving module 1206 may be operative, or configured, to perform this action.

Determining 1102, based on the received first information regarding the cell identity, that the cell 115 is or at least appears to be the same and suitable cell to camp on as before, such as before being in a sleep mode and/or in an unreachable state as described above. The determination may be in response to that the device has woke up in the cell 115 after being in the sleep mode and/or in the unreachable state, and thus has changed to the reachable state. The determination may thus have the effect that, or in other words may, the device (re)select the same cell as it earlier, or most recently, camped on.

The device 1200 and/or the processing module 1201 and/or the processing circuit 1204 and/or the determining module 1207 may be operative, or configured, to perform this action.

Receiving 1103, from the wireless communication network, e.g. the first network node 110, second information regarding the cell identity. The second information may be comprised in System Information, "SI". The second information may thus be associated with the SI, e.g. such that the cell identity may be of the cell that is sending, such as broadcasting, the SI. The cell identity of the second information should uniquely identify the cell in the wireless communication network. The second information regarding the cell identity may comprise a specific Cell ID number or bit sequence, that may be of a two octet size, and/or Location Area and Routing Area information.

The device should thus receive and/or read and/or use the cell identity of the second information and/or the SI. The receipt and/or read and/or use of the cell identity of the second information and/or the SI should be in response to the determination in the foregoing action and should be a mandatory, such as non-optional, response thereto, i.e. in case of such determination as in action 1002. This removes a risk of wrong assumption that it is the same cell based on only the first information.

The device 1200 and/or the processing module 1201 and/or the processing circuit 1204 and/or the I/O module 1205 and/or the receiving module 1206 may be operative, or configured, to perform this action.

The third method may further comprise one or more of the following actions:

Determining 1104 to re-read the second information and/or the SI, based on signal measurements on a signal associated with the cell, typically on a reference signal of the cell, and a certain threshold. The certain threshold, e.g. as given by a threshold value, may be predefined and/or predetermined, or be configurable, and e.g. be comprised in or identified by the SI. The signal measurements and the certain threshold should indicate an improvement, or in other words a positive change, in the signal, e.g. in signal strength and/or signal quality of the signal. For example, the second information and/or the SI may be re-read if an absolute signal change, based on the signal measurements, exceed the certain threshold. This can avoid such problems as indicated elsewhere herein.

The device 1200 and/or the processing module 1201 and/or the processing circuit 1204 and/or the determining module 1207 may be operative, or configured, to perform this action.

Solution 3—MA Number Network Planning

In EC-GSM-IoT 32 MA Numbers are available in a cell to indicate the ARFCNs in a channel group. The linkage between a MA Number and a set of ARFCNs in a channel group is described in the EC SI. As explained above, using the same MA number with different meanings in two cells using the same BCH ARFCN and BSIC may result in uncontrollable MS behavior leading to unwanted interference.

Typically a GSM cell is not configured to use more than three channel groups. So it is possible to use different MA numbers in cells configured with the same BCH ARFCN and BSIC. A MS waking up in a new cell without recognizing this that manages to access and receive an Immediate assignment will abort the TBF in a controlled manner in case the assigned MA number is an invalid number, i.e. a MA Number not listed in the EC SI. So by planning the used MA Numbers over an EC-GSM-IoT NW the situation described above can be avoided.

For example, in Cell A MA Number 0,1,2 is used, in Cell B MA Number 3,4,5 is used, in Cell C MA number 6,7,8 is used etc. A MS waking up in cell B but believing it is still in Cell A would be assigned either MA Number 3,4,5, but will believe the only possible MA Numbers to be assigned are 0,1,2. This will result in an abnormal release of the TBF setup procedure and should trigger a reading of the EC SI, in which case the MS will find out the Cell ID, and Location Area and Routing Area information, and understand it is in Cell B.

This is referred to as MA Number network planning and can be used to minimize the effects of BSIC confusion from the MS side. It will not have impact to a standard document but would be an implementation option for the network vendor to avoid the above mentioned BSIC confusion effect.

The following concerns a fourth method, relating to the third solution.

The fourth method is for configuring a wireless communication network, such as the wireless communication network 100, comprising multiple cells, e.g. the cell 115, for serving devices, e.g. the communication device 120. The wireless communication network being configured to in each of said multiple cells send, e.g. broadcast, an indicator of the cell, e.g. a Change Mark, for indicating a change in Service Information, "SI", of the cell. The indicator of each cell typically being restricted so that it only can indicate a limited amount of different values or number, e.g. by being assigned a certain number of bits and/or by that only certain values are valid and/or have been assigned to be used for the indicator of each cell. The devices, e.g. the communication device 120, may be configured to monitor the indicator in a cell that it is located and/or served in and may be configured to, in case it differs compared to last time it monitored the indicator, in said cell or another cell, receives and/or re-reads the SI of the cell it is located and/or served in and thereby e.g. receive information regarding the cell identity. This information and thus the SI may comprise a specific Cell ID number or bit sequence, that may be of a two octet size, and/or Location Area and Routing Area information.

The indicators, or Change Marks, may associated with, e.g. specific for, a certain channel of the cell, e.g. a Broadcast CHannel (BCH), and may be named a BCH Change Mark. The indicators, or Change Marks, may further be specific for the second type of devices, e.g. for devices supporting and/or operating according to EC-GSM, and may e.g. be named EC BCH Change Marks.

The fourth method comprises the action of:

Assigning indicators as above to the multiple cells. The indicators should be assigned so that adjacent and/or neighboring cells are assigned indicators having different values or numbers. The assignment may be part of an initial configuration of the wireless communication network, e.g. to be used when the wireless communication network is being deployed for use, e.g. when it becomes operable for the first time and/or after a reset and/or restart.

Adjacent and/or neighboring cells may thereby start with different indicator values or numbers.

The present action may be accomplished by assigning change mark starting bit maps to the multiple cells.

The wireless communication network may thus be provided with an initial configuration as above, i.e. so that the wireless communication network is initially configured with indicators of adjacent and/or neighboring cells that are having different values or numbers.

Solution 4—"Triggers for Reading of System Information"

For EC-GSM-IoT and PEO a MS is today mandated to trigger cell reselection in case a MS experiences a degradation in signal strength exceeding a threshold known as C1_DELTA, see e.g. 3GPP TS 45.008 v13.1.0. A MS changing cell during a period of sleep will trigger cell reselection in case the signal strength has degraded when it wakes up. A straightforward addition to today's requirement is to require that the system information is read even if the mobile station selects the same cell as earlier camped on as the most suitable, according to the BCH ARFCN and BSIC information. This will guarantee that the Cell ID and/or the Location Area and Routing Area information are read even if the device wakes up in a new cell with same BCH ARFCN and BSIC as the cell where it went to sleep under the requirement that the signal strength degradation goes below C1_DELTA.

In addition, a new requirement could be added where a MS is required to reread the SI in case the absolute signal change exceeds a new threshold value of a specified or configurable level set in the SI. This would force detection of the two octet Cell ID and/or the Location Area and Routing Area information in the SI even if the MS experiences a positive change in measured serving cell signal power. This would help to avoid the problems described above.

Embodiments herein thus aims at removing or at least reducing the likelihood of ambiguous cell identification, e.g. by introducing a BSIC extension or by introducing a set of methods to secure that the System Information two octet Cell ID Information Element is read when a cell change between two cells configured with the same BSIC and BCH ARFCN has occurred.

The following concerns a fifth method, relating to the fourth solution.

The fifth method is for configuring a wireless communication network, such as the wireless communication network 100, comprising multiple cells, e.g. the cell 115, for serving devices, e.g. the communication device 120. The wireless communication network being configured to in each of said multiple cells send, e.g. broadcast, one or more certain numbers, e.g. so called MA numbers, e.g. as described in 3GPP TS 44.018 v13.1.0. Each of said certain numbers may indicate ARFCNs in a channel group. The relation, e.g. linkage, between such certain number and a set of ARFCNs in the channel group may be indicated in SI of the cell. The SI may be specific for the second type of devices and e.g. be named EC SI.

The fifth method comprises the action of:

Assigning certain numbers as above to the multiple cells so that different such certain numbers are assigned, and thus will be used, for cells that are configured with the same BCH ARFCN and BSIC. BCC ARFCN and BSIC has been described elsewhere herein.

The wireless communication network may thus be provided with a configuration with said certain numbers assigned as above.

Figure 13A:
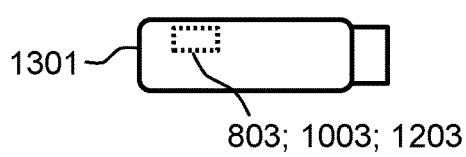
FIGS. 13*a-c* are schematic drawings illustrating embodiments relating to computer programs and computer readable media to cause the network node and/or device to perform the first method and/or second method and/or the third method, respectively.
Figure 13B:
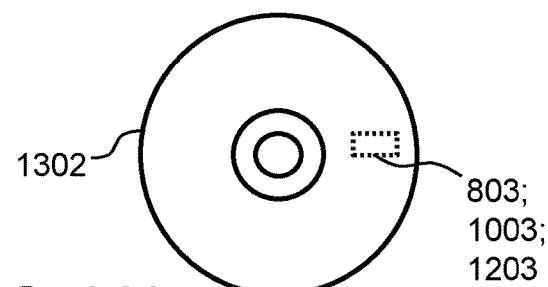
Figure 13C:
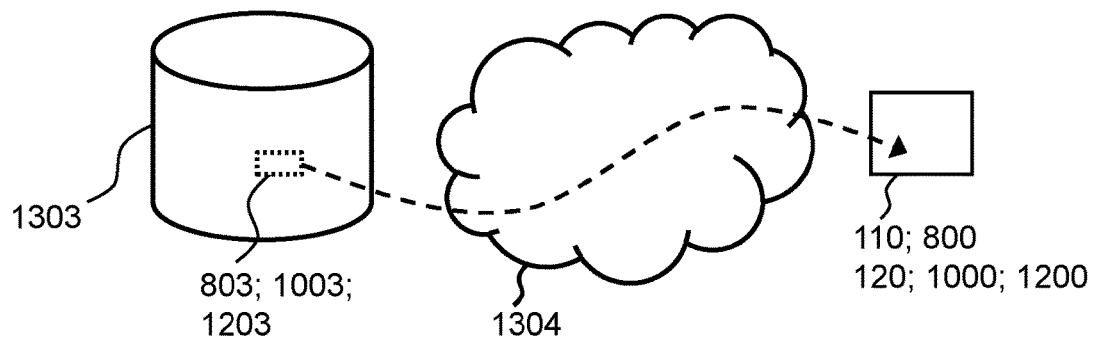

FIGS. 13a-c are schematic drawings illustrating embodiments relating to a computer program that may be any one of the computer programs 803, 1003 and 1203, and that comprises instructions that when executed by the respective processing circuit causes the node comprising it to perform the respective method as described above.

In some embodiments there is provided a computer program product, i.e. a data carrier, comprising a computer-readable medium and the computer program stored on the computer-readable medium. By computer readable medium may be excluded a transitory, propagating signal and the computer readable medium may correspondingly be named non-transitory computer readable medium. Non-limiting examples of the computer-readable medium is a memory card or a memory stick 1301 as in FIG. 13a, a disc storage medium 1302 such as a CD or DVD as in FIG. 13b, a mass storage device 1303 as in FIG. 13c. The mass storage device 1303 is typically based on hard drive(s) or Solid State Drive(s) (SSD). The mass storage device 1303 may be such that is used for storing data accessible over a computer network 1304, e.g. the Internet or a Local Area Network (LAN).

The computer programs, respectively, may furthermore be provided as a pure computer program or comprised in a file or files. The file or files may be stored on the computer-readable medium and e.g. available through download e.g. over the computer network 1304, such as from the mass storage device 1303 via a server. The server may e.g. be a web or File Transfer Protocol (FTP) server. The file or files may e.g. be executable files for direct or indirect download to and execution on the a node for carrying out a method, e.g. by the processing circuit, or may be for intermediate download and compilation to make them executable before further download and execution causing the node(s) to perform the respective method as described above.

It should be noted that any of the actions above may fully or partly involve and/or be initiated and/or be triggered by another, e.g. external, entity or entities, such as device and/or system, than what may actually be carrying out the actions. Such initiation may e.g. be triggered by said another entity in response to a request from the wireless communication network 100 and/or in response to some event resulting from commutations and/or program code executing in said another entity or entities. Said another entity or entities may correspond to or be comprised in a so called computer cloud, or simply cloud, e.g. and/or communication with said another entity or entities may be accomplished by means of one or more cloud services.

Further note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the first node and the second node to be configured to and/or to perform the above-described methods, respectively.

Identification by any identifier herein may be implicit or explicit. The identification may be unique in the wireless communication network 100 or at least in a part or some area thereof.

The term "network", or simply "NW", as may be used herein typically, as should be realized without any information on the contrary, refer to the wireless communication network 100. The term "MS", as used herein typically, as should be realized without any information on the contrary, refer to the device 120.

The term "network node" as used herein may as such refer to any type of radio network node (described below) or any network node, which may communicate with at least a radio network node. Examples of such network nodes include any radio network node stated above, a core network node, Operations & Maintenance (O&M), Operations Support Systems (OSS), Self Organizing Network (SON) node, positioning node etc.

The term "radio network node" as used herein may as such refer to any type of network node serving a wireless device and/or that are connected to other network node(s) or network element(s) or any radio node from which a wireless device receives signals. Examples of radio network nodes are Node B, Base Station (BS), Multi-Standard Radio (MSR) node such as MSR BS, eNB, eNodeB, network controller, RNC, Base Station Controller (BSC), relay, donor node controlling relay, Base Transceiver Station (BTS), Access Point (AP), transmission points, transmission nodes, nodes in distributed antenna system (DAS) etc.

The term "communication device", "wireless device", or simply "device", as used herein, may as such refer to any type of device arranged to communicate, e.g. with a radio network node, in a wireless, cellular and/or mobile communication system, such as the wireless communication network 100, and may thus be a wireless communication device. Examples include: target devices, device to device UE, device for Machine Type of Communication (MTC), MTC device, machine type UE or UE capable of machine to machine (M2M) communication, Personal Digital Assistant (PDA), iPAD, Tablet, mobile terminals, smart phone, Laptop Embedded Equipment (LEE), Laptop Mounted Equipment (LME), Universal Serial Bus (USB) dongles etc. While said terms are used frequently herein for convenience, or in the context of examples involving other 3GPP nomenclature, it must be appreciated that the term as such is non-limiting and the teachings herein apply to essentially any type of wireless device.

The term "node" as used herein may as such refer to any type of network node or device, such as described above.

Note that although terminology used herein may be particularly associated with and/or exemplified by certain cellular communication systems, wireless communication networks etc., depending on terminology used, such as wireless communication networks based on 3GPP, this should as such not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that any enumerating terminology such as first network node, second network node, first base station, second base station, or similar, that may have been used herein, as such should be considering non-limiting and the terminology as such does not imply a certain hierarchical relation. Without any explicit information in the contrary, naming by enumeration should be considered merely a way of accomplishing different names.

The invention claimed is:

1. A method, performed by a network node of a Global System for Mobile Communication (GSM) network, for managing a cell identity of a cell in the GSM network, which cell identity is directed to devices configured to be served in the GSM network, wherein the method comprises:
   obtaining a cell identifier for identifying said cell, wherein the cell identifier is a Base Station Identity Code (BSIC) coding an identity of said cell, wherein said identity of said cell identifies said cell within a group of cells that use the same frequency for their Broadcast Channels (BCHs), and wherein the cell identifier is formed from at least three sets of bits, including a first three-bits set that is a Network Color Code (NCC), a second three-bits set that is a Base Station Color Code (BCC), and an additional, third set comprising one or more bits; and
   transmitting the cell identifier in the cell by transmitting the NCC and the BCC on a Synchronization Channel (SCH), and transmitting the third set of bits on one or more of a Broadcast Control Channel (BCCH), a Paging Channel (PCH), and an Access Grant Channel (AGCH), the third set of bits enabling said devices to discriminate between cells of the network that use the same NCC and BCC and a same BCCH Absolute Radio Frequency Channel Number (ARFCN).

2. The method as claimed in claim 1, wherein the method further comprises:
   receiving the cell identifier back from a device in response to the device having received the transmitted cell identifier.

3. The method as claimed in claim 2, wherein the cell identifier is received on a Random Access Channel (RACH).

4. A method, performed by a device, for managing a cell identity of a cell in a Global System for Mobile Communication (GSM) network, wherein the method comprises:
   receiving, from a network node comprised in the GSM network, a cell identifier for identifying said cell, wherein the cell identifier is a Base Station Identity Code (BSIC) coding an identity of said cell, wherein the cell identifier comprises three sets of bits, including a first three-bits set that is a Network Color Code (NCC), a second three-bits set that is a Base Station Color Code (BCC), and an additional, third set comprising one or more bits;
   wherein receiving the cell identifier comprises receiving the NCC and the BCC on a Synchronization Channel (SCH) and receiving the third set of bits on one or more of a Broadcast Control Channel (BCCH), a Paging Channel (PCH), and an Access Grant Channel (AGCH); and
   wherein the method further comprises the device using the third set of bits to discriminate between cells of the network that use the same NCC and BCC and a same BCCH Absolute Radio Frequency Channel Number (ARFCN).

5. The method as claimed in claim 4, wherein the method further comprises:
   sending the received cell identifier back to the network node.

6. The method as claimed in claim 5, wherein the cell identifier is sent back on a Random Access Channel (RACH).

7. A network node for managing a cell identity of a cell in a Global System for Mobile Communication (GSM) network that the network node is configured to be comprised in, which cell identity is directed to devices configured to be served in the GSM network, wherein the network node comprises a processing circuit configured to:
   obtain a cell identifier for identifying said cell, wherein the cell identifier is a Base Station Identity Code (BSIC) coding an identity of said cell, wherein said identity of said cell identifies said cell within a group of cells that use the same frequency for their Broadcast Channels (BCHs), and wherein the cell identifier is formed from at least three sets of bits, including a first three-bits set that is a Network Color Code (NCC), a second three-bits set that is a Base Station Color Code (BCC), and an additional, third set comprising one or more bits; and
   transmit the cell identifier in the cell by transmitting the NCC and the BCC on a Synchronization Channel (SCH), and transmitting the third set of bits on one or more of a Broadcast Control Channel (BCCH), a Paging Channel (PCH), and an Access Grant Channel (AGCH), the third set of bits enabling said devices to discriminate between cells of the network that use the same NCC and BCC and a same BCCH Absolute Radio Frequency Channel Number (ARFCN).

8. The network node as claimed in claim 7, wherein the processing circuit is further configured to:
   receive the cell identifier back from a device in response to the device having received the transmitted cell identifier.

9. The network node as claimed in claim 8, wherein the cell identifier is received on a Random Access Channel (RACH).

10. A device for managing a cell identity of a cell in a Global System for Mobile Communication (GSM) network, wherein the device comprises a processing circuit configured to:
    receive, from a network node comprised in the GSM network, a cell identifier for identifying said cell, wherein the cell identifier is a Base Station Identity Code (BSIC) coding an identity of said cell, wherein the cell identifier comprises three sets of bits, including a first three-bits set that is a Network Color Code (NCC), a second three-bits set that is a Base Station Color Code (BCC), and an additional, third set comprising one or more bits;
    wherein the device receives the NCC and the BCC on a Synchronization Channel (SCH) and receives the third set of bits on one or more of a Broadcast Control Channel (BCCH), a Paging Channel (PCH), and an Access Grant Channel (AGCH); and wherein the processing circuit is further configured to use the third set of bits to discriminate between cells of the network that use the same NCC and BCC and a same BCCH Absolute Radio Frequency Channel Number (ARFCN).

11. The device as claimed in claim 10, wherein the processing circuit is further configured to send the received cell identifier back to the network node.

12. The device as claimed in claim 11, wherein the cell identifier is sent back on one or more of the following: a Random Access Channel (RACH).

* * * * *